(12) United States Patent
Choi et al.

(10) Patent No.: US 9,733,770 B2
(45) Date of Patent: Aug. 15, 2017

(54) TOUCH SENSING STRUCTURE AND DISPLAY DEVICE INCLUDING THE SAME

(71) Applicant: Samsung Display Co. Ltd., Yongin, Gyeonggi-Do (KR)

(72) Inventors: Chung Sock Choi, Seoul (KR); Jin Koo Kang, Cheonan-si (KR); Soo Youn Kim, Siheung-si (KR); Seung Hun Kim, Hwaseong-si (KR); Hyun Ho Kim, Hwaseong-si (KR); Seung Yong Song, Suwon-si (KR); Cheol Jang, Uiwang-si (KR); Sang Hwan Cho, Suwon-si (KR); Sang Hyun Park, Hwaseong-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/503,049

(22) Filed: Sep. 30, 2014

(65) Prior Publication Data

US 2015/0293560 A1  Oct. 15, 2015

(30) Foreign Application Priority Data

Apr. 14, 2014  (KR) .......................... 10-2014-0044245

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04111* (2013.01)

(58) Field of Classification Search
CPC .......... G06F 1/16; G06F 3/0412; G06F 3/044; G06F 2203/04111
See application file for complete search history.

(56) References Cited

U.S. PATENT DOCUMENTS

| | | | |
|---|---|---|---|
| 2010/0007621 A1* | 1/2010 | Kang ...................... | G06F 3/044 345/173 |
| 2011/0187677 A1* | 8/2011 | Hotelling .............. | G06F 3/0412 345/174 |
| 2012/0086673 A1* | 4/2012 | Chien ................... | G06F 3/0428 345/175 |

(Continued)

FOREIGN PATENT DOCUMENTS

| KR | 10-2002-0088488A | A | 11/2002 |
|---|---|---|---|
| KR | 10-2011-0049476 | A | 5/2011 |

(Continued)

*Primary Examiner* — Premal Patel
(74) *Attorney, Agent, or Firm* — Knobbe Martens Olson & Bear, LLP

(57) ABSTRACT

A touch sensing structure and display device including the same are disclosed. In one aspect, the display device includes a display panel including a light-emitting region and a non-light-emitting region and a touch sensor formed over the display panel and including a plurality of sensing patterns. The display device also includes a destructive interference unit formed over the display panel and overlapping the touch sensor. The destructive interference unit includes a plurality of dielectric layers and a plurality of metal layers that are alternately stacked. At least one of the metal layers includes a plurality of metal patterns that are separated from each other.

20 Claims, 18 Drawing Sheets

(56) References Cited

U.S. PATENT DOCUMENTS

| | | | | |
|---|---|---|---|---|
| 2012/0280612 A1* | 11/2012 | Lee | .................... | H01L 51/5281 |
| | | | | 313/504 |
| 2013/0127776 A1* | 5/2013 | Guard | ................... | G06F 3/0412 |
| | | | | 345/174 |
| 2014/0117330 A1 | 5/2014 | Cho et al. | | |
| 2014/0198268 A1* | 7/2014 | Sugita | .................... | G06F 3/044 |
| | | | | 349/12 |
| 2015/0079372 A1* | 3/2015 | Tsai | ....................... | G06F 3/044 |
| | | | | 428/216 |

FOREIGN PATENT DOCUMENTS

| KR | 10-2011-0137129 A | 12/2011 |
|---|---|---|
| KR | 10-2012-0047054 A | 5/2012 |
| KR | 10-2013-0044058 A | 5/2013 |
| KR | 10-2014-0056498 A | 5/2014 |
| KR | 10-2014-0147199 A | 12/2014 |
| KR | 10-2015-0048999 A | 5/2015 |
| KR | 10-2015-0054193 A | 5/2015 |

* cited by examiner

TOUCH SENSING STRUCTURE AND DISPLAY DEVICE INCLUDING THE SAME

CROSS-REFERENCE TO RELATED APPLICATIONS

This application is based on and claims priority from Korean Patent Application No. 10-2014-0044245, filed on Apr. 14, 2014 in the Korean Intellectual Property Office, the disclosure of which is incorporated herein in its entirety by reference.

BACKGROUND

Field

The described technology generally relates to a touch sensing structure and a display device.

Description of the Related Technology

Touch panels are input devices which enable a user command to be input via the selection of instructions displayed on the screen of a display panel or the like. Such touch panels can replace other types of input devices, such as keyboards and mice, and thus the use of touch panel is increasing.

Touch panels are typically attached to the display panel of a display device. In order to improve the portability of such display devices, technologies enabling the manufacture thin, lightweight display devices are being actively developed.

SUMMARY OF CERTAIN INVENTIVE ASPECTS

One inventive aspect is a display device comprising a display panel including a light-emitting region and a non-light-emitting region, a touch sensing portion arranged on an upper portion of the display panel and including a plurality of sensing patterns, and a destructive interference portion arranged on the upper portion of the display to overlap the touch sensing portion and including a plurality of dielectric layers and a plurality of metal layers that are alternately stacked, wherein at least one of the metal layers includes a plurality of metal patterns that are separated from each other.

Another aspect is a touch sensing structure comprising a destructive interference portion including a plurality of dielectric layers and a plurality of metal layers that are alternately stacked, and a touch sensing portion arranged to overlap the destructive interference portion and including a plurality of sensing patterns, wherein at least one of the metal layers includes a plurality of metal patterns that are separated from each other.

Another aspect is a display device comprising a display panel including a light-emitting region and a non-light-emitting region; a touch sensor formed over the display panel and including a plurality of sensing patterns; and a destructive interference unit formed over the display panel and overlapping the touch sensor, wherein the destructive interference unit includes a plurality of dielectric layers and a plurality of metal layers that are alternately stacked, wherein at least one of the metal layers includes a plurality of metal patterns that are separated from each other.

The destructive interference unit can comprise a first dielectric layer; a first metal layer formed below the first dielectric layer and including a plurality of first metal patterns that are separated from each other; a second dielectric layer formed below the first metal layer; and a second metal layer formed below the second dielectric layer and including a plurality of second metal patterns that are separated from each other, wherein the second metal patterns respectively overlap the first metal patterns. The area of each of the first and second metal patterns can be substantially equal to or less than the area of each of the sensing patterns. The second metal patterns can be arranged to completely overlap the first metal patterns. Each of the sensing patterns can overlap one or more of the first metal patterns and one or more of the second metal patterns.

The display device can further comprise a third metal layer formed below the second metal layer and including a plurality of third metal patterns that are separated from each other; and a third dielectric layer interposed between the second metal layer and the third metal layer, wherein the third metal patterns respectively overlap the first metal patterns and the second metal patterns. The area of each of the third metal patterns can be substantially equal to or less than the area of each of the sensing patterns. The third metal patterns can be arranged to completely overlap the first metal patterns and the second metal patterns. Each of the sensing patterns can overlap one or more of the first metal patterns, one or more of the second metal patterns, and one or more of the third metal patterns. At least one of the metal layers can comprise an opening overlapping the light-emitting region. The display device can comprise an encapsulation member formed over the display panel and the touch sensor and the destructive interference unit can be interposed between the encapsulation member and the display panel.

The display device can further comprise an encapsulation member formed over the display panel, wherein the destructive interference unit is interposed between the encapsulation member and the display panel and wherein the touch sensor is formed over the encapsulation member. The display device can further comprise an encapsulation member formed over the display panel, wherein the touch sensor and the destructive interference unit are formed over the encapsulation member. The touch sensor can comprise a plurality of first electrodes each including a plurality of first sensing patterns connected to each other in a first direction; and a plurality of second electrodes each including a plurality of second sensing patterns connected to each other in a second direction crossing the first direction. Each of the dielectric layers can be formed of any one material selected from the following: silicon oxide ($SiO_2$), titanium oxide ($TiO_2$), lithium fluoride (LiF), calcium fluoride ($CaF_2$), magnesium fluoride ($MgF_2$), silicon nitride ($SiN_x$), tantalum oxide ($Ta_2O_5$), niobium oxide ($Nb_2O_5$), silicon carbonitride (SiCN), molybdenum oxide ($MoO_x$), iron oxide ($FeO_x$), chromium oxide ($CrO_x$), and strontium oxide ($SnO_2$). Each of the metal layers can be formed of any one material selected from the following: chromium (Cr), molybdenum (Mo), tungsten (W), titanium (Ti), nickel (Ni), cobalt (Co), copper oxide (CuO), titanium nitride ($TiN_x$), and nickel sulfide (NiS).

Another aspect is a touch sensing structure comprising a destructive interference unit including a plurality of dielectric layers and a plurality of metal layers that are alternately stacked; and a touch sensor overlapping the destructive interference unit and including a plurality of sensing patterns, wherein at least one of the metal layers includes a plurality of metal patterns that are separated from each other.

The destructive interference unit can comprise a first dielectric layer; a first metal layer formed below the first dielectric layer and including a plurality of first metal patterns that are separated from each other; a second dielectric layer formed below the first metal layer; and a second metal layer formed below the second dielectric layer and including a plurality of metal patterns that are separated from each other, wherein the second metal patterns respectively overlap the first metal patterns, and wherein each of the sensing patterns overlaps one or more of the first metal patterns and one or more of the second metal patterns. The touch sensing structure can further comprise a third metal layer formed below the second metal layer and including a plurality of third metal patterns that are separated from each other; and a third dielectric layer interposed between the second metal layer and the third metal layer, wherein the third metal patterns respectively overlap the first metal patterns and the second metal patterns, and wherein each of the sensing patterns overlaps one or more of the first metal patterns, one or more of the second metal patterns, and one or more of the third metal patterns. The touch sensor can comprise a plurality of first electrodes each including a plurality of first sensing patterns connected to each other in a first direction and a plurality of second electrodes each including a plurality of second sensing patterns connected to each other in a second direction crossing the first direction.

According to at least one embodiment, at least the following effects can be achieved.

Since the touch sensing structure according to at least one embodiment can both prevent the reflection of ambient light and includes the function of a display device, the reflection of the ambient light can be reduced without including a separate circular polarizing plate, and thus the accuracy of touch input recognition can be improved.

Since the display device according to at least one embodiment can prevent the reflection of ambient light without including a separate circular polarizing plate, resulting in an increased visibility and a reduction in the overall thickness of the display device.

Since the display device according to at least one embodiment can perform both the function of preventing the reflection of ambient light and the function of the display device, the overall thickness of the display device can be further reduced.

The effects according to the described technology are not limited to the contents as exemplified above, but further various effects are included in the description.

DETAILED DESCRIPTION OF CERTAIN INVENTIVE EMBODIMENTS

Figure 1:
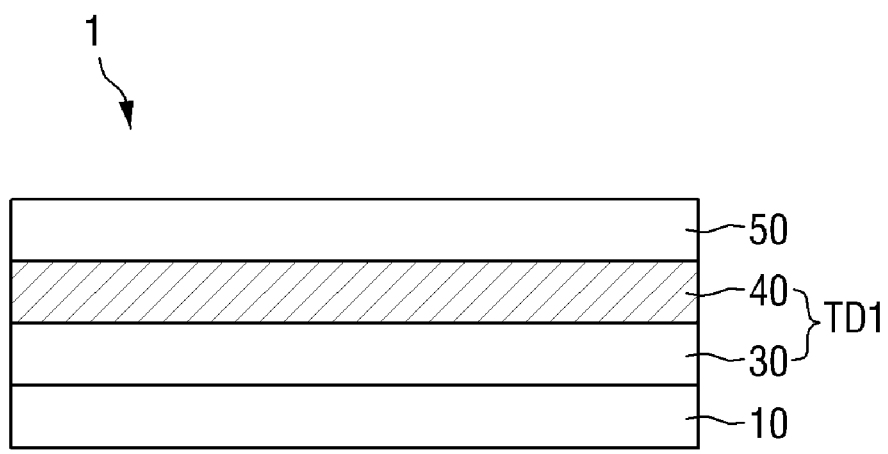
FIG. 1 is a cross-sectional view illustrating the schematic stacked structure of a display device according to an embodiment.

When the standard display device is used outdoors, ambient light, such as sunlight, is reflected from the display device, lowering the contrast and visibility of the display device. Accordingly, a circular polarizing plate can be placed on one surface of the display device to reduce the reflection of ambient light.

However, circular polarizing plates include several layers, such as a linear polarizing plate, a ¼-wavelength phase difference plate, an adhesive layer, and a protection layer. Thus, the standard circular polarizing plate has a thickness of about 0.15 mm to about 0.3 mm, increasing the thickness of a display device including the plate. Thus, the reduction in the thickness of display devices is limited due to the minimum thickness of circular polarizing plates.

Accordingly, one issue to be solved by the described technology is to provide a touch sensing structure which can both prevent the reflection of ambient light and add touch sensing functionality to a display device.

Another issue to be solved by the described technology is to provide a display device which can both prevent reflection of ambient light and have touch sensing functionality, resulting in a thin profile and improved contrast and visibility.

Additional advantages, issuess, and features of the described technology will be set forth in part in the description which follows and in part will become apparent to those having ordinary skill in the art upon examination of the following or may be learned from practice of the described technology.

The described technology will now be described more fully hereinafter with reference to the accompanying drawings, in which embodiments of the described technology are shown. The described technology may, however, be embodied in different forms and should not be construed as limited to the embodiments set forth herein. Rather, these embodiments are provided so that this disclosure will be thorough and complete, and will filly convey the scope of the described technology to those skilled in the art. The same reference numbers indicate the same components throughout the specification. In the attached figures, the thicknesses of layers and regions may be exaggerated for the sake of clarity.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the described technology.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" as used herein means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein are to be interpreted accordingly.

Hereinafter, embodiments of the described technology will be described with reference to the accompanying drawings.

Figure 2:
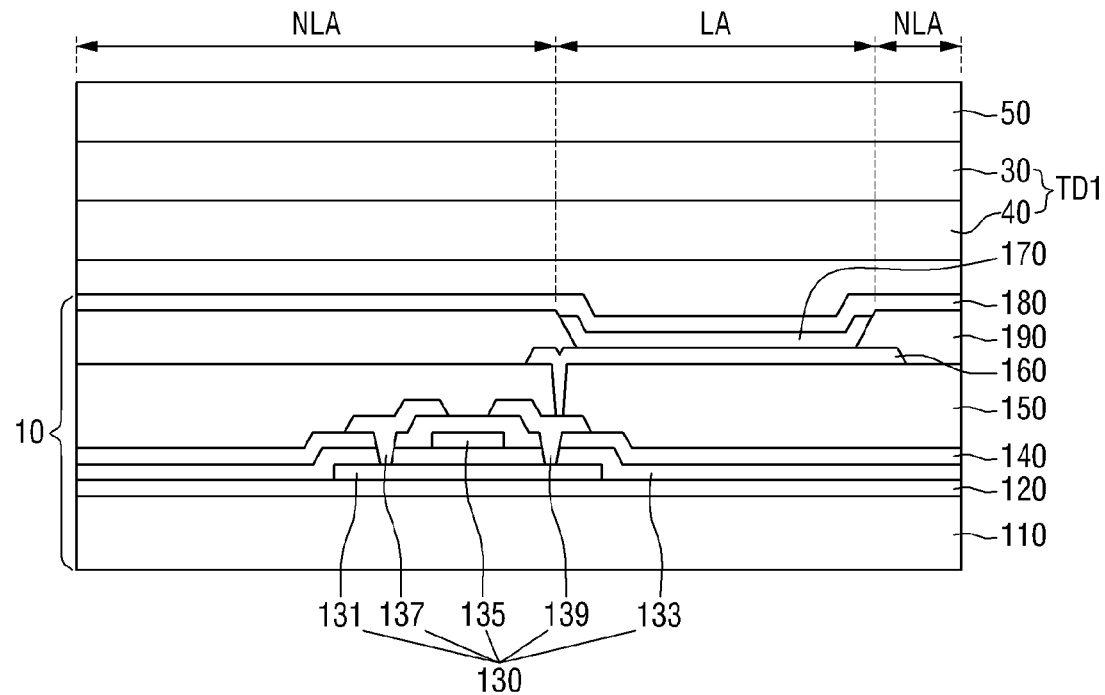
FIG. 2 is an enlarged cross-sectional view of a portion of the display panel of the display device illustrated in FIG. 1.

FIG. 1 is a cross-sectional view illustrating a schematic stacked structure of a display device according to an embodiment. FIG. 2 is an enlarged cross-section view of a portion of a display panel in the display device illustrated in FIG. 1.

Referring to FIG. 1, the display device 1 includes a display panel 10, a destructive interference portion or destructive interference unit 30, and a touch sensing portion or touch sensor 40 positioned on the destructive interference portion 30. The display device 1 further includes an encapsulation member 50 positioned on the touch sensing portion 40. Although not illustrated in the drawing, the display device 1 may further include a window positioned on the encapsulation member 50 and an adhesive layer provided between the encapsulation member 50 and the window to improve the adhesive force between the encapsulation member 50 and the window.

Referring to FIGS. 1 and 2, the display panel 10 includes a first substrate 110, a thin film transistor 130, a first electrode 160, a light-emitting structure 170, and a second electrode 180.

The first substrate 110 may be a transparent insulating substrate. For example, the first substrate 110 may be a glass substrate, a quartz substrate, or a transparent resin substrate. Exemplarily, the transparent resin substrate may include polyimide-based resin, acryl-based resin, polyacrylate-based resin, polycarbonate-based resin, polyether-based resin, sulfuric acid-based resin, and/or polyethylene-terephthalate-based resin, but is not limited thereto.

A buffer layer 120 is formed on the first substrate 110. The buffer layer 120 can prevent metal atoms or impurities from being diffused through the first substrate 110. Further, the buffer layer 120 can also improve the flatness of the surface of the first substrate 110 when the surface of the first substrate 110 is not uniform. The buffer layer 120 may be formed of a silicon compound. For example, the buffer layer 120 may include silicon oxide ($SiO_x$), silicon nitride ($SiN_x$), silicon oxynitride ($SiO_xN_y$), silicon oxycarbide ($SiO_xC_y$), and/or silicon carbonitride ($SiC_xN_y$). The above values X and Y may be integers that are equal to or larger than zero, but are not limited thereto. The buffer layer 120 may have a single-layer structure or a multilayer structure. For example, the buffer layer 120 may have a single-layer structure or a multilayer structure including a silicon oxide layer, a silicon nitride layer, a silicon oxynitride layer, a silicon oxycarbide layer and/or a silicon carbonitride layer.

A switching element, for example, a thin film transistor 130, is formed on the buffer layer 120. The thin film transistor 130 includes an active layer 131, a gate insulating layer 133, a gate electrode 135, a source electrode 137, and a drain electrode 139.

The active layer 131 may be formed of polycrystalline silicon, but is not limited thereto. The active layer 131 may be formed of an oxide semiconductor. For example, the active layer 131 may be an IGZO layer (($In_2O_3)_a(Ga_2O_3)_b(ZnO)_c$ layer) (where, a, b, and c are real numbers that satisfy the conditions of a≥0, b≥0, and c>0), but is not limited thereto. When the active layer 131 is formed of an oxide semiconductor, light permeability of the display panel can be further improved.

The gate insulating layer 133 can be formed on the buffer layer 120 while covering the active layer 131 and the gate electrode 135 can be formed on the gate insulating layer 133.

The gate insulating layer 133 may be formed of silicon oxide ($SiO_x$), silicon nitride ($SiN_x$), and/or silicon oxynitride (SiON). Specifically, the gate insulating layer 133 may be formed as a single layer or a multilayer, and when the gate insulating layer 133 is formed as a multilayer, it has a structure in which a silicon nitride layer and a silicon oxide layer are stacked. In these embodiments, the gate insulating layer 133 is formed on a region that contacts the active layer 131, which is formed as a silicon oxide layer and a silicon nitride layer is formed below the silicon oxide layer. When the silicon oxide layer contacts the active layer 131, the active layer 131 can be prevented from deteriorating. When the gate insulating layer 133 is formed as a silicon oxynitride layer, the silicon oxynitride layer may have an oxygen concentration distribution therein. Even in this embodiment, the active layer 131 can be prevented from deteriorating by increasing the oxygen concentration of the silicon oxide layer adjacent to the active layer 131.

The gate electrode 135 is formed on the gate insulating layer 133 and overlaps the active layer 131. The gate electrode 135 may include a metal, an alloy, a metal nitride, a conductive metal oxide, and/or a transparent conductive material. For example, the gate electrode 135 may be formed of an aluminum-series metal, such as aluminum (Al) or an aluminum alloy; a silver-series metal, such as silver (Ag) or a silver alloy; a copper-series metal, such as copper (Cu) or a copper alloy; a molybdenum-series metal, such as molybdenum (Mo) or a molybdenum alloy; chromium (Cr); titanium (Ti); and/or tantalum (Ta), but is not limited thereto. Further, the gate electrode may have a multilayer structure that includes two conductive layers (not illustrated) having different physical properties. One of the two conductive layers may be formed of a metal having a low resistivity, for example, an aluminum-series metal, s silver-series metal, or a copper-series metal, to reduce the signal delay or voltage drop of the gate electrode 135. In contrast, the other of the two conductive layers may be formed of a different material, in particular, a material having superior contact characteristics with zinc oxide (ZnO), indium tin oxide (ITO), or indium zinc oxide (IZO), for example, a molybdenum-series metal, chromium, titanium, or tantalum. Examples of such a combination may be a chromium lower layer and an aluminum upper layer, an aluminum lower layer and a molybdenum upper layer, or a titanium lower layer and a copper upper layer. However, the described technology is not limited thereto, and the gate electrode 135 may be formed of various kinds of metals and conductors.

An interlayer insulating layer 140 is formed on the gate insulating layer 135 to cover the gate electrode 133 and the source electrode 137 and the drain electrode 139 are formed on the interlayer insulating layer 140. That is, the interlayer insulating layer 140 electrically insulates the gate electrode 135 from the source and drain electrodes 137 and 139. The interlayer insulating layer 140 may be formed of a silicon compound. For example, the interlayer insulating layer 140 may include silicon oxide, silicon nitride, silicon oxynitride, silicon oxycarbide, and/or silicon carbonitride, but is not limited thereto.

The source and drain electrodes 137 and 139 are arranged on the interlayer insulating layer 140. The source and drain electrodes 137 and 139 are spaced apart from each other by a predetermined distance with respect to the gate electrode 135. The source and drain electrodes 137 and 139 penetrate through the interlayer insulating layer 140 and respectively contact the source and drain regions of the active layer 131. The source and drain electrodes 137 and 139 may be formed of a single layer or a multilayer that is composed of Ni, Co, Ti, Ag, Cu, Mo, Al, Be, Nb, Au, Fe, Se, and/or Ta. Further, the source and drain electrodes 137 and 139 may also be formed of an alloy that includes one or more of the above metals and at least one element selected from the following: Ti, Zr, W, Ta, Nb, Pt, Hf, O, or N. Examples of the multilayer include a double layer, such as Ti/Cu, Ta/Al, Ta/Al, Ni/Al, Co/Al, or Mo (Mo alloy)/Cu and a triple layer, such as Mo/Al/Mo, Ti/Al/Ti, Ta/Al/Ta, Ti/Al/TiN, Ta/Al/Ni, or Co/Al/Co. However, these materials and structures are merely exemplary, and the source and drain electrodes 137 and 139 are not limited to the above-described materials and structures.

The structure of the thin film transistor 130 is not necessarily limited to that as described above, but various types of structures may be applied to the thin film transistor 130. For example, the above-described thin film transistor 130 is described as having a top-gate structure. However, this is merely exemplary, and the thin film transistor 130 may have a bottom-gate structure in which the gate electrode 135 is located below the active layer 131. In addition, all structures of the thin film transistor, which are currently developed and commercialized or which can be implemented according to future technical development, may be applied to the thin film transistor 130 according to the described technology.

An insulating layer 150, which covers the source and drain electrodes 137 and 130 is formed on the interlayer insulating layer 140. The insulating layer 150 may be formed to have a single-layer structure or a multilayer structure including at least two insulating layers. In exemplary embodiments, a planarization process can be performed on the insulating layer 150 to improve the surface flatness of the insulating layer 150. For example, by performing a chemical mechanical polishing process or an etch-back process on the insulating layer 150, the insulating layer 150 can be formed to have a substantially flat upper surface. The insulating layer 150 may be formed of an organic material. For example, the insulating layer 150 may include a photoresist, an acryl-based resin, a polyimide-based resin, a polyamide-based resin, and/or a siloxane-based resin, which can be used solely or in combination. In another exemplary embodiment, the insulating layer 150 may be formed of an inorganic material, such as a silicon compound, a metal, and/or a metal oxide. For example, the insulating layer 150 may include silicon oxide, silicon nitride, silicon oxynitride, silicon oxycarbide, silicon carbonitride, aluminum, magnesium, zinc, hafnium, zirconium, titanium, tantalum, aluminum oxide, titanium oxide, tantalum oxide, magnesium oxide, zinc oxide, hafnium oxide, zirconium oxide, or titanium oxide, which may be used solely or in combination.

The first electrode 160 is formed on the insulating layer 150 and contacts the drain electrode 139 via a contact hole formed in the insulating layer 150. Further, a contact that fills the contact hole or a pad may be formed on the drain electrode 160, and the first electrode 160 may electrically contact the drain electrode 160 through the contact or the pad. In accordance with the light-emitting type of the display device 1, the first electrode 160 may be formed of a material that is reflective or a material that is light permeable. For example, the first electrode 160 may include aluminum, an alloy containing aluminum, aluminum nitride, silver, an alloy containing silver, tungsten, tungsten nitride, copper, an alloy containing copper, nickel, chromium, chromium nitride, molybdenum, an alloy containing molybdenum, titanium, titanium nitride, platinum, tantalum, tantalum nitride, neodymium, scandium, strontium ruthenium oxide, zinc oxide, indium tin oxide, tin oxide, indium oxide, gallium oxide, or indium zinc oxide, which may be used solely or in combination. Further, the first electrode 160 may be formed as a single-layer structure or a multilayer structure including a metal layer, an alloy layer, a metal nitride layer, a conductive metal oxide layer and/or a transparent conductive material layer.

A pixel-defining layer 190 is formed on the first electrode 160. The pixel-defining layer 190 may be formed of an organic material or an inorganic material. For example, the pixel-defining layer 190 may be formed of a photoresist, a polyacryl-based resin, a polyimide-based resin, an acryl-based resin, or a silicon compound. Further, the pixel-defining layer 190 may be formed on the first electrode 160 using a spin coating process, a spray process, a printing process, or a chemical vapor deposition process. In exemplary embodiments, an opening is formed to partially expose the first electrode 160 through etching of the pixel-defining layer 190. A light-emitting region LA and a non-light-emitting region NLA of the display device 1 are defined by the openings in the pixel-defining layer 190. In other words, the area defined by the opening in the pixel-defining layer 190 correspond to the light-emitting region LA and the remaining areas, for example, areas adjacent to the opening in the pixel-defining layer 190, correspond to the non-light-emitting region NLA.

The light-emitting structure 170 is formed on the area of the first electrode 160 that is exposed through the opening in the pixel-defining layer 190. Further, the light-emitting structure 170 may also be formed on the side walls of the opening in the pixel-defining layer 190. In exemplary embodiments, the light-emitting structure 170 has a multilayer structure that includes an organic light-emitting layer EL, a hole injection layer HIL, a hole transport layer HTL, an electron transport layer ETL, and an electron injection layer EIL. The organic light-emitting layer of the light-emitting structure 170 may be formed of light-emitting materials that can generate different colors of light, such as red, green and blue light for each pixel. In another exemplary embodiment, the organic light-emitting layer of the light-emitting structure 170 has a structure in which a plurality of light-emitting materials that can emit different colors of light, such as the red, green and blue light are stacked to emit white light.

The second electrode 180 is formed on the pixel-defining layer 190 and the light-emitting structure 170. In accordance with the light-emitting type of the display device 1, the second electrode 180 may also include a material that is reflective or a material that is light permeable. For example, the second electrode 180 may include aluminum, an alloy containing aluminum, aluminum nitride, silver, an alloy containing silver, tungsten, tungsten nitride, copper, an alloy containing copper, nickel, chromium, chromium nitride, molybdenum, an alloy containing molybdenum, titanium, titanium nitride, platinum, tantalum, tantalum nitride, neodymium, scandium, strontium ruthenium oxide, zinc oxide, indium tin oxide, tin oxide, indium oxide, gallium oxide, or indium zinc oxide, which may be used solely or in combination. Further, the second electrode 180 may be formed via a printing process, a sputtering process, a chemical vapor deposition process, an atomic layer laminating process, a vacuum deposition process, or a pulse laser deposition process. In an exemplary embodiment, the second electrode 180 is formed as a single-layer structure or a multilayer structure including a metal layer, an alloy layer, a metal nitride layer, a conductive metal oxide layer and/or a transparent conductive material layer.

Referring again to FIG. 1, a touch sensing structure TD1 is formed on the display panel 10 and the touch sensing structure TD1 includes a destructive interference portion 30 and a touch sensing portion 40.

The destructive interference portion 30 is formed on the display panel 10. The destructive interference portion 30 can prevent ambient light from being reflected via destructive interference. The destructive interference portion 30 includes a plurality of dielectric layers 32, 34, and 36 (in FIG. 3) and a plurality of metal layers 33, 35, and 37 (in FIG. 3). At least one of the plurality of metal layers includes a plurality of metal patterns 331, 351, and 371 (in FIG. 4) that are separated from each other. The destructive interference portion 30 will be described in more detail later. In exemplary embodiments, a predetermined space is formed between the display panel 10 and the destructive interference portion 30. Air or an inert gas such as nitrogen ($N_2$) may be enclosed in the space between the display panel 10 and the destructive interference portion 30. According to other exemplary embodiments, a protection layer (not illustrated) is additionally arranged between the display panel 10 and the destructive interference portion 30. In these embodiment, the protection layer may be formed of a photoresist, an acryl-based resin, a polyimide-based resin, a polyamide-based resin, and/or a siloxane-based resin, but is not limited thereto.

The touch sensing portion 40 is formed on the destructive interference portion 30. The touch sensing portion 40 senses a touch input received via a user's finger or a stylus pen and includes a plurality of sensing patterns 421 and 441 (in FIG. 6). The touch sensing portion 40 will be described in detail later. The encapsulation member 50 is formed on the touch sensing portion 40. The encapsulation member 50 may be a transparent insulating substrate. For example, the encapsulation member 50 may be formed of glass, quartz, or transparent insulating resin.

As described above, the window may be formed on the encapsulation member 50 and the window may be fixed to the encapsulation member 50 via the adhesive layer. The adhesive layer may be formed of rubber-based adhesives, acryl-based adhesives, vinyl ether-based adhesives, silicon-based adhesives, urethane-based adhesives, or pressure-sensitive adhesives.

The window may include a transparent material, such as glass or a polymer material. The window can protect the destructive interference portion 40 and the touch sensing portion 30 from external impacts.

Figure 3:
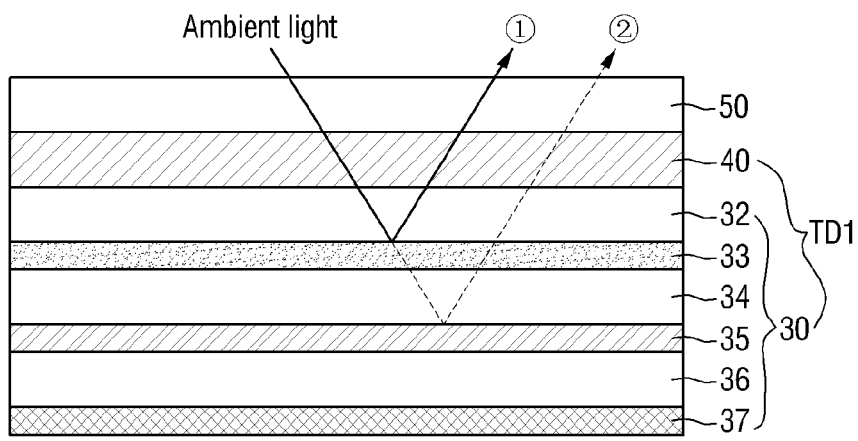
FIG. 3 is a cross-sectional view illustrating the schematic stacked structure of the touch sensing structure in the display device illustrated in FIG. 1.

FIG. 3 is a cross-sectional view illustrating the schematic stacked structure of the touch sensing structure in the display device illustrated in FIG. 1.

Referring to FIGS. 1 and 3, the touch sensing structure TD1 is formed below the encapsulation member 50 and includes the destructive interference portion 30 and the touch sensing portion 40. The destructive interference portion 30 reduces the reflection of ambient light by causing destructive interference to occur in the light reflected therefrom. Destructive interference refers to the phenomenon where the superposition of light having substantially equal amplitudes and a phase difference of about 180° have an overall amplitude of substantially zero. In the embodiment of FIG. 3, light waves reflected from the interfaces between layers are superimposed to destructively interfere.

The destructive interference portion 30 includes a plurality of metal layers and a plurality of dielectric layers, which are alternately stacked. For example, the destructive interference portion 30 may include a first dielectric layer 32, a first metal layer 33, a second dielectric layer 34, and a second metal layer 35. FIG. 3 illustrates an embodiment in which the metal layers 33 and 35 and the dielectric layers 32 and 34 are formed below the touch sensing portion 40 in the order of the first dielectric layer 32, the first metal layer 33, the second dielectric layer 34, and the second metal layer 36. However, this is merely exemplary, and in some embodiments, the stacked structure of the metal layers and the dielectric layers are formed below the lower portion of the touch sensing portion 40 in the order of the first metal layer, the first dielectric layer, the second metal layer, and the second dielectric layer.

The first dielectric layer 32 is a phase matching layer or a phase compensation layer. For example, since it is difficult to ensure that the reflected light having a wide range of wavelengths has a phase difference of about 180°, the first dielectric layer 32 can partially compensate for deviations from the desired phase difference in the reflected light of about 180° based on the wavelengths of the ambient light. In some embodiments, the first dielectric layer 32 include any one material selected from the following: silicon oxide ($SiO_2$), titanium oxide ($TiO_2$), lithium fluoride (LiF), calcium fluoride ($CaF_2$), magnesium fluoride ($MgF_2$), silicon nitride (SiN$_x$), tantalum oxide (Ta$_2$O$_5$), niobium oxide (Nb$_2$O$_5$), silicon carbonitride (SiCN), molybdenum oxide (MoO$_x$), iron oxide (FeO$_x$), chromium oxide (CrO$_x$), and strontium oxide (SnO$_2$), which may be used solely or in combination. In some embodiments, the first dielectric layer 32 can have a thickness of about 50 nm to about 120 nm, but is not limited thereto.

The first metal layer 33 is formed below the first dielectric layer 32. The first metal layer absorbs a portion of the ambient light and reflects another portion of the ambient light. The first metal layer 33 may be formed of a material having a high light absorption rate, for example, a material that contains metal, which has a light absorption rate of substantially equal to or greater than about 30%, so as to reduce the amount of reflected ambient light through absorption of a portion of the incident light. The material that contains metal may be a material having a refractive index of about 1.5 to about 7 and an absorption coefficient of about 1.5 to about 7. In some embodiments, the first metal layer 33 includes any one material selected from the following: chromium (Cr), molybdenum (Mo), tungsten (W), titanium (Ti), nickel (Ni), cobalt (Co), copper oxide (CuO), titanium nitride (TiN$_x$), and nickel sulfide (NiS) or an alloy thereof, which can be used solely or in combination.

In some embodiments, the first metal layer 33 has a light permeability of about 40% or greater similar to how the standard circular polarizing film has a light permeability of about 43% or greater. That is, the thickness of the first metal layer 33 may be set to have a light absorption rate of about 60% or less and the first metal layer 33 may have a thickness that satisfies Equation 1 below.

$$d1 \leq 0.6\lambda/2\pi n1 k1 \qquad \text{[Equation 1]}$$

In Equation 1, d1 denotes the thickness of the first metal layer 33, λ denotes the wavelength of ambient light, n1 denotes the refractive index of the first metal layer 33, and k1 denotes the absorption coefficient of the first metal layer 33.

The second dielectric layer 34 is formed below the first metal layer 33. In a similar manner to the first dielectric layer 32, the second dielectric layer 34 may include any one material selected from the following: silicon oxide (SiO$_2$), titanium oxide (TiO$_2$), lithium fluoride (LiF), calcium fluoride (CaF$_2$), magnesium fluoride (MgF$_2$), silicon nitride (SiN$_x$), tantalum oxide (Ta$_2$O$_5$), niobium oxide (Nb$_2$O$_5$), silicon carbonitride (SiCN), molybdenum oxide (MoO$_x$), iron oxide (FeO$_x$), chromium oxide (CrO$_x$), and strontium oxide (SnO$_2$), which may be used solely or in combination. The second dielectric layer 34 phase matches the reflected light so that the difference between the phase of the first reflected light ① reflected from the surface of the first metal layer 33 and the phase of the second reflected light ② reflected from the surface of the second metal layer 35 after penetrating through the first metal layer 33 and the first dielectric layer 32 is about 180° to ensure destructive interference in the ambient light reflected from the destructive interference portion 30.

In some embodiments, the difference between the phase of a first reflected light ① and the phase of the second reflected light ② is set to become about 180°. For example, the optical thickness of the first metal layer 33 and the second dielectric layer 34 may be set to a value (λ/4) that changes the phase by about 90° when the ambient light that is incident from the environment passes through the first metal layer 33 and the second dielectric layer 34 and this may be set by Equation 2 below. Further, if the thickness of the first metal layer 33 is set, the thickness d2 of the second dielectric layer 34 may be set by Equation 2 below.

$$(n1 d1)+(n2 d2)=\lambda/4 \qquad \text{[Equation 2]}$$

In Equation 2, d1 denotes the thickness of the first metal layer 33, d2 denotes the thickness of the second dielectric layer 34, λ denotes the wavelength of ambient light, n1 denotes the refractive index of the first metal layer 33, and n2 denotes the refractive index of the second dielectric layer 34.

The second metal layer 35 is formed below the second dielectric layer 34. In a similar manner to the first metal layer 33, the second metal layer 35 may be formed of a material that contains metal, which has a light absorption rate of substantially equal to or greater than about 30%. In some embodiments, the second metal layer 35 includes any one material selected from the following: chromium (Cr), molybdenum (Mo), tungsten (W), titanium (Ti), nickel (Ni), cobalt (Co), copper oxide (CuO), titanium nitride (TiN$_x$), and nickel sulfide (NiS) or an alloy thereof, which can be used solely or in combination. Further, in some embodiments, the second metal layer 35 is formed to have a thickness that corresponds to the absorption rate of about 60% or less similar to how the standard circular polarizing film has a light permeability of about 43% or greater. The second metal layer 35 may have a thickness that satisfies Equation 1 as above.

The destructive interference portion 30 according to this embodiment can offset a first reflected light ①, which is reflected from the surface of the first metal layer 33 and has a phase changed of about 180° compared to the incident ambient light and a second reflected light ② having a phase changed of about 360° compared to the incident ambient light. The second reflected light is reflected from the ambient light that is incident from the environment and penetrates the first metal layer 33 and passes through the second dielectric layer 34, causing a phase change of about 90°, is reflected from the surface of the second metal layer 35 causing a phase change of about 180°, and then passes through the second dielectric layer 34 and the first metal layer 33 causing another phase change of about 90°. Thus, the first reflected light ① and the second reflected light ② have a phase difference of about 180°. That is, the destructive interference portion 30 has the advantage that it can replace the standard circular polarizing plate that is used to reduce the reflection of ambient light, improve the visibility of the display device, reduce the overall thickness of the display device, and simplify the structure of the display device.

The destructive interference portion 30 may further include at least one of a third metal layer 37 and a third dielectric layer 36 according to circumstances.

The third metal layer 37 is formed below the second metal layer 35 and the third dielectric layer 36 is interposed between the third metal layer 37 and the second metal layer 35.

In some embodiments, the third metal layer 37 is a light blocking layer. For example, the third metal layer 37 may correspond to the non-light-emitting region NLA (in FIG. 2) of the display panel 1 and may include a light permeation opening formed in an area that overlaps the light-emitting region LA (in FIG. 2) of the display panel 1. The third metal layer 37 may be arranged to be relatively close to the display panel 10 in comparison to the first and second metal layers 33 and 35. The third metal layer 37 may be formed of any one material selected from the following: chromium (Cr), molybdenum (Mo), aluminum (Al), silver (Au), titanium (Ti), carbon black, and copper oxide (CuO). The third metal layer 37 may have a thickness that can prevent ambient light from penetrating into the light-emitting region LA (in FIG. 2) of the display panel. In an exemplary embodiment, the third metal layer 37 has a thickness of about 50 nm or greater, but is not limited thereto.

In another exemplary embodiment, the first metal layer 33 or the second metal layer 35 may be a light blocking layer and may include a light permeation opening in an areas that overlaps the light-emitting region LA (in FIG. 2) of the display panel 1. For example, if the first metal layer 33 is a light blocking layer, the second metal layer 35 and the third metal layer 37 prevent the reflection of ambient light through destructive interference. Further, if the second metal layer 35 is a light blocking layer, the first metal layer 33 and the third metal layer 37 contribute to the prevention of the reflection of ambient light through destructive interference.

In the embodiment of FIG. 3, the third dielectric layer 36 is interposed between the second metal layer 35 and the third metal layer 37. Since the explanation of the third dielectric layer 36 is the same as or similar to that of the first and/or second dielectric layers 32 and 34, a detailed description thereof will be omitted. Hereinafter, en embodiment where the destructive interference portion 30 includes the third dielectric layer 36 is exemplified. However, this is merely exemplary and the third dielectric layer 36 may be omitted when necessary. The touch sensing portion 40 can be formed on the destructive interference portion 30. The touch sensing portion 40 can be attached to the destructive interference portion 30 via a separate adhesive layer or can be spaced apart from the destructive interference portion 30.

At least one of the first metal layer 33, the second metal layer 35, and the third metal layer 37 may include a plurality of metal patterns that are spaced apart from each other. Hereinafter, it is exemplified that each of the first metal layer 33, the second metal layer 35, and the third metal layer 37 has a plurality of metal patterns that are spaced apart from each other, but the scope of the described technology is not limited thereto.

Figure 4:
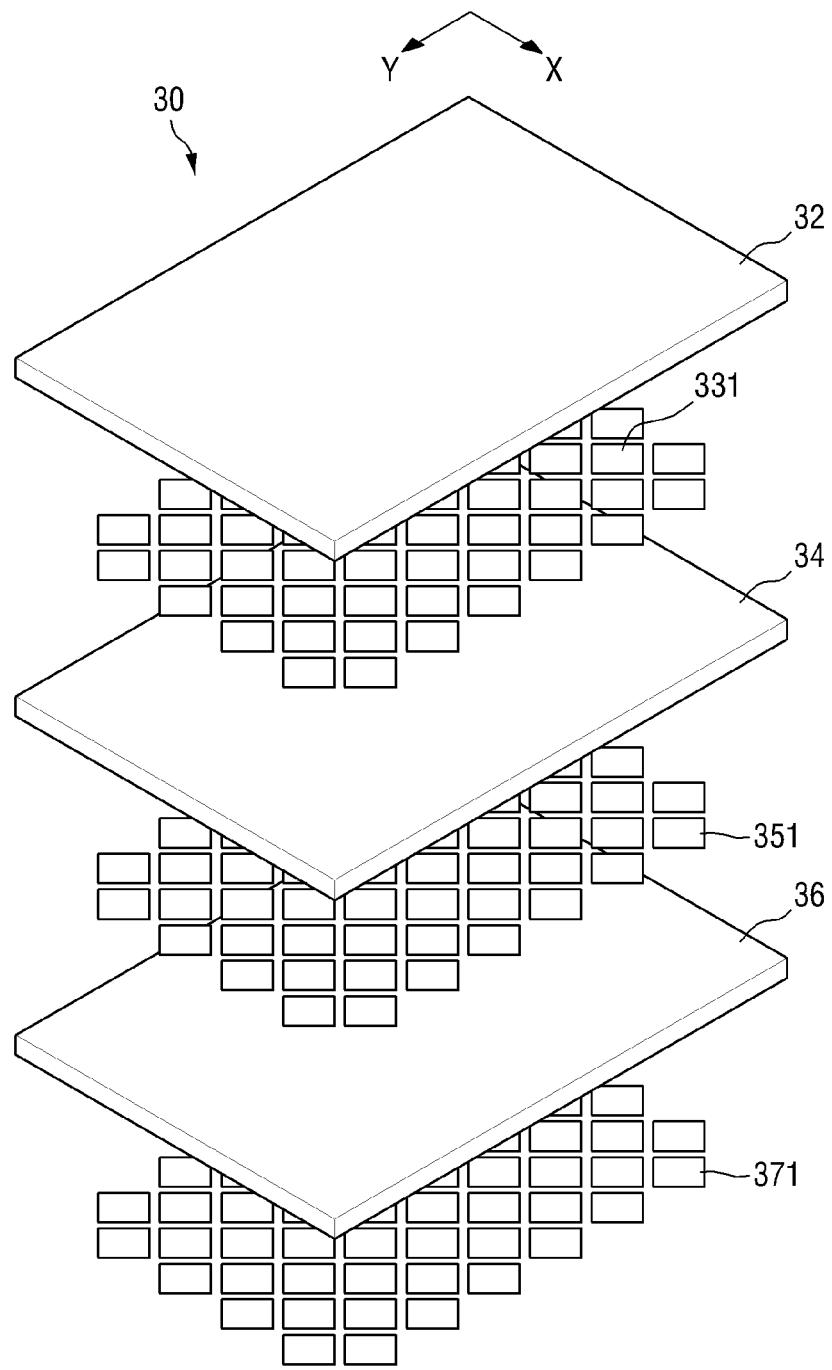
FIG. 4 is an exploded perspective view illustrating an exemplary structure of the destructive interference portion illustrated in FIG. 3.

FIG. 4 is an exploded perspective view illustrating an exemplary structure of a destructive interference portion illustrated in FIG. 3.

Referring to FIGS. 1, 3, and 4, the destructive interference portion 30 includes the first dielectric layer 32, the first metal layer 33 formed below the first dielectric layer 32, the second dielectric layer 34 formed below the metal layer 33, and the second metal layer 35 formed below the second dielectric layer 34 as described above with reference to FIG. 3. The embodiment of FIGS. 1, 3 and 4 further includes the third dielectric layer 36 and the third metal layer 37 formed below the second metal layer 35.

The first metal layer 33 formed below the first dielectric layer 32 includes a plurality of first metal patterns 331 that are separated from each other. Here, the separation may refer to physical separation or electrical insulation. There is no limit to the planar shape of the first metal patterns 331. For example, each of the first metal patterns 331 may have a substantially rhombic shape or a substantially diamond shape, but is not limited thereto. The first metal pattern 331 may have a substantially circular, elliptical, or rectangular shape. Further, the first metal pattern 331 may have the same shape as the shape of a sensing pattern of the touch sensing layer 40 to be described layer.

The second metal layer 35 is positioned below the second dielectric layer 334 and includes a plurality of second metal patterns 351 that are separated from each other. In the same manner as the first metal patterns 331, the second metal patterns 351 may have various shapes. Further, the second metal patterns 351 may have substantially the same planar shape as the first metal patterns 331. In addition, the arrangement of the second metal patterns 351 may be substantially the same as the arrangement of the first metal patterns 331, but is not limited thereto.

In some embodiments, the second metal patterns 351 overlap the first metal patterns 331. In some embodiments, the second metal patterns 351 and the first metal patterns 331 completely overlap each other. In other words, the second metal patterns 351 are respectively aligned with the first metal patterns 331 in these embodiments and the second metal patterns 351 are positioned in areas that corresponds to the first metal patterns 331. In other words, when the destructive interference portion 30 is viewed from the upper side (or the upper side of the first dielectric layer) based on the drawing, the first metal patterns 331 substantially completely cover the second metal patterns 351 and the second metal pattern 351 are hidden from view due to the first metal patterns 331.

The third metal layer 37 is formed below the third dielectric layer 36 and the third metal layer 37 includes a plurality of third metal patterns 371 that are separated from each other.

The third metal patterns 371 may have various shapes in the same manner as the first and second metal patterns 331 and 351. Further, the third metal patterns 371 may have substantially the same planar shape as the first and second metal patterns 331 and 351. In addition, the arrangement of the third metal patterns 371 may be substantially the same as the arrangement of the first and/or metal patterns 331 or 351, but is not limited thereto.

In some embodiments, the third metal patterns 371 overlap the first and second metal patterns 331 and 351, and in some embodiments, the third metal patterns substantially completely overlap the first and second metal patterns 331 and 351. In other words, the third metal patterns 371 are respectively aligned with the first and second metal patterns 331 and 351 in these embodiments, and the third metal pattern 371 are formed in areas that respectively corresponds to the first and second metal patterns 331 and 351. In other words, when the destructive interference portion 30 is viewed from the upper side (or the upper side of the first dielectric layer) based on the drawing, only the first metal patterns 331 can be seen, and the second and third metal layers 351 and 371 are hidden from view due to the first metal patterns 331.

In some embodiments, the first metal patterns 331, the second metal patterns 351, and the third metal patterns 371 may have substantially the same planar shapes, and are arranged in substantially the same positions in their respective planes. In these embodiments, since the first metal patterns 331, the second metal patterns 351, and the third metal patterns 371 can be formed using one mask having the same patterns, the manufacturing process can be simplified, and the manufacturing cost can be reduced due to the reduction of the number of masks.

Figure 5:
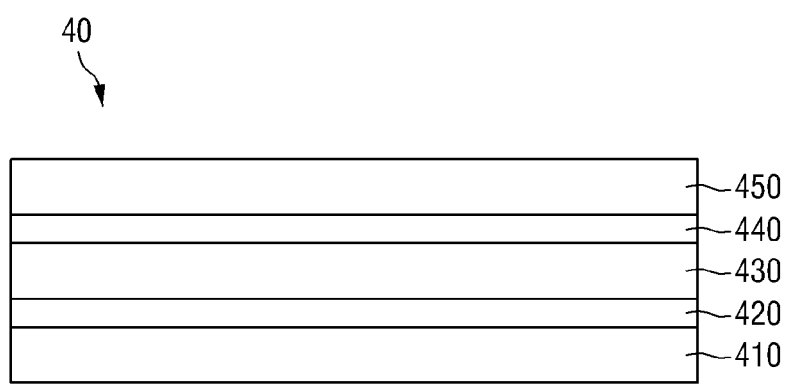
FIG. 5 is a cross-sectional view illustrating the schematic stacked structure of the touch sensing portion in the display device illustrated in FIG. 1.
Figure 6:
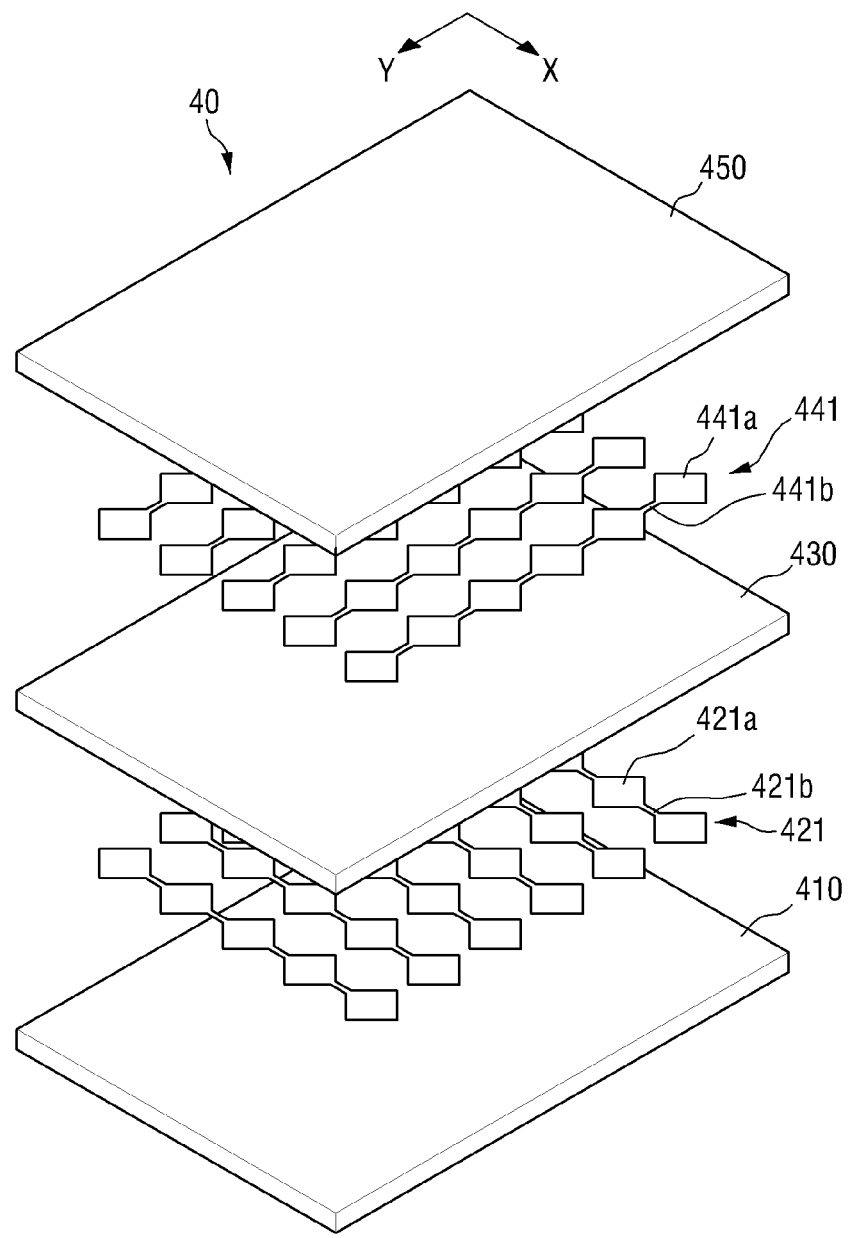
FIG. 6 is an exploded perspective view illustrating the schematic structure of the touch sensing portion illustrated in FIG. 5.

FIG. 5 is a cross-sectional view illustrating the schematic stacked structure of the touch sensing portion in the display device illustrated in FIG. 1. FIG. 6 is an exploded perspective view illustrating the schematic structure of the touch sensing portion illustrated in FIG. 5.

Referring to the embodiment of FIGS. 1 and 3 to 6, the touch sensing portion 40 includes a first insulating substrate 410, a first electrode layer 420 formed on the first insulating substrate 410, a second insulating substrate 450 facing the first insulating substrate 410, and a second electrode layer 440 formed below the second insulating substrate 450. The touch sensing portion 40 further includes an insulating layer 430 formed between the first electrode layer 420 and the second electrode layer 440.

The first insulating layer 410 may be formed of a transparent member, such as a glass substrate having a predetermined transparency or a film substrate that is flexible. In some embodiments, the film substrate may be formed of polyethylene terephthalate (PET), polymethyl methacrylate (PMMA), polypropylene (PP), polyethylene (PE), polyethylene naphthalene dicarboxylate (PEN), polycarbonate (PC), polyethersulfone (PES), polyimide (PI), polyvinyl alcohol (PVA), cyclic olefin copolymer (COC), styrene polymer, polyethylene, or polypropylene, but is not limited thereto.

The first electrode layer 420 is formed on the first insulating substrate 410 and includes a plurality of first electrodes 421. The first electrodes 421 extend in a first direction (or X direction). The first electrodes 421 are arranged in a second direction (or Y direction) and are spaced apart from each other in the second direction.

The first electrodes 421 include a plurality of first sensing patterns 421a that measure a change in capacitance together with the second electrodes 441 to be described later in order to sense a touch input generated by a user's finger or the like. The first electrodes 421 also include a plurality of first connection portions 421b connecting the first sensing patterns 421a that are adjacent to each other in the first direction (or X direction). In exemplary embodiments, the planar shape of the first sensing patterns 421a may be a substantially rhombic shape or a substantially diamond shape, but is not limited thereto. The first sensing patterns 421a may have a substantially circular, elliptical, or rectangular shape. Further, in the drawings, it is illustrated that the first sensing patterns 421a are wider than the first connection portions 421b, but this is merely exemplary. In some embodiments, the first electrode 421 have a stripe shape or a rectangular shape, and in these embodiments, the first sensing pattern 421a have substantially the same widths as the first connection portions 421b.

The first electrode 421 may be formed of a transparent conductive material. In some embodiments, the first electrode 421 may be formed of indium zinc oxide (IZO), indium tin oxide (ITO), zinc oxide (AnO), tin oxide (SnO$_2$), indium oxide (In$_2$O$_3$), or conductive polymer. The conductive polymer is an organic-based compound and as the conductive polymer, polythiopenene, polypyrole, polyanyline, polyacetylene, or polyphenylene based conductive polymer can be used. In an exemplary embodiment, polythiopenene based PEDOT/PSS compound may be used, or one or more kinds of organic-based compounds may be combined to be used.

The area of each of the first sensing patterns 421a may be substantially equal to or greater than the areas of the metal patterns 331, 351, and 371 included in the destructive interference portion 30. In some embodiments, the areas of the first sensing patterns 421a is substantially equal to or greater than the areas of at least one of the first metal pattern 331, the second metal pattern 351, and the third metal pattern 371. Further, the areas of the first sensing patterns 421a may be greater than the areas of the first metal pattern 331, the areas of the second metal pattern 351, and the areas of the third metal pattern 371.

When the areas of the first sensing patterns 421a is greater than the areas of the first metal patterns 331, the areas of the second metal pattern 351, and the areas of the third metal pattern 371, the number of each of first to third metal patterns 331, 351, and 371, which overlap the first sensing pattern 421a, may be one or more. That is, when one of each of the first, second and third metal patterns 331, 351 and 371 which overlap the first sensing pattern 421a and overlap each other in the drawings, are called, for convenience, a first metal pattern group, the number of first metal pattern groups that overlap one of the first sensing patterns 421a may be one or more. Further, the number of the first sensing patterns 421a that overlap the first metal group pattern may be one.

Similar to the first insulating substrate 410, the second insulating substrate 450 may be formed of a transparent substrate, such as a glass substrate or a film substrate. The detailed description of the second insulating substrate 450 will be omitted since it is substantially the same as that of the first insulating substrate 410.

The second electrode layer 440 is formed on one surface (e.g., the lower surface in the drawing) of the second insulating substrate 450 that faces the first insulating substrate 410. The second electrode layer 440 includes a plurality of second electrodes 441. The second electrodes 441 extend in the second direction (or Y direction). The second electrodes 441 are spaced apart from each other in the first direction (or X direction). In exemplary embodiments, similar to the first sensing patterns 421a, the planar shape of the second sensing patterns 441a have a substantially rhombic shape or a substantially diamond shape, but are not limited thereto.

Similar to the first electrode 421, the second electrode 441 may be formed of a transparent conductive material.

The second electrode 441 includes a plurality of second sensing patterns 441a and a plurality of second connection portions 441b connecting the adjacent second sensing patterns 441a to each other. The second sensing patterns 441a are arranged in the second direction (or Y direction) that crosses the first direction (or X direction).

In some embodiments, similar to the first sensing patterns 421a, the areas of the second sensing patterns 441a is substantially equal to or greater than the areas of at least one of the first metal patterns 331, the second metal patterns 351, and the third metal patterns 371. Further, the areas of the second sensing patterns 441a may be greater than the areas of the first metal patterns 331, the areas of the second metal patterns 351, and the areas of the third metal patterns 371.

When the areas of the second sensing patterns 441a are greater than the areas of the first metal patterns 331, the areas of the second metal patterns 351, and the areas of the third metal patterns 371, the number of first to third metal patterns 331, 351, and 371, which overlap the second sensing pattern 441a, may be one or more. That is, when one of the first metal patterns 331, one of the second metal patterns 351, and one of the third metal patterns 371, which overlap one of the second sensing patterns 441a and overlap each other in the drawings, are called, for convenience, a second metal pattern group, the number of second metal pattern groups that overlap one of the second sensing patterns 441a may be one or more. Further, the number of the second sensing patterns 441a that overlap the second metal group pattern may be one.

The insulating layer 430 may be interposed between the first electrode 421 and the second electrode 441. The insulating layer 430 may be formed of a transparent material and may be formed of an insulating material that is adhesive, but is not limited thereto.

When an object, such as a user's finger or a stylus pen, contacts the upper portion of the touch sensing portion 40 having the above-described configuration, a change in capacitance is transferred to the driving circuit via the first and second electrodes 421 and 441 that correspond to the contact position, metal wires (not illustrated), and position detection lines (not illustrated). Then, the change in capacitance is converted into an electrical signal indicating the contact position.

Figure 7:
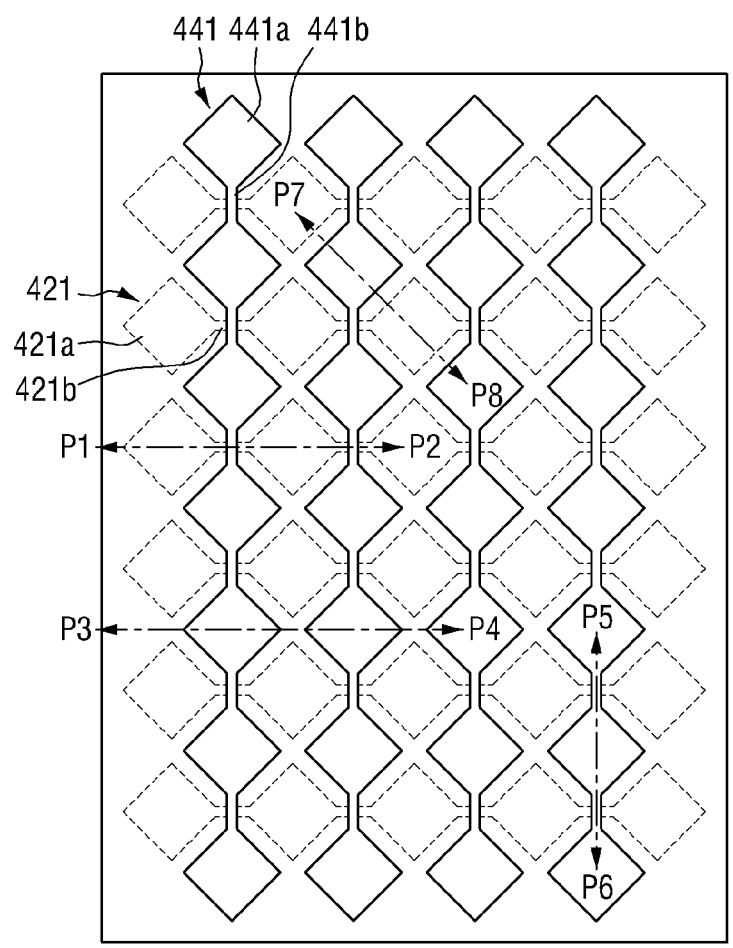
FIG. 7 is a plan view illustrating the exemplary structure of the display device illustrated in FIG. 1.
Figure 8:
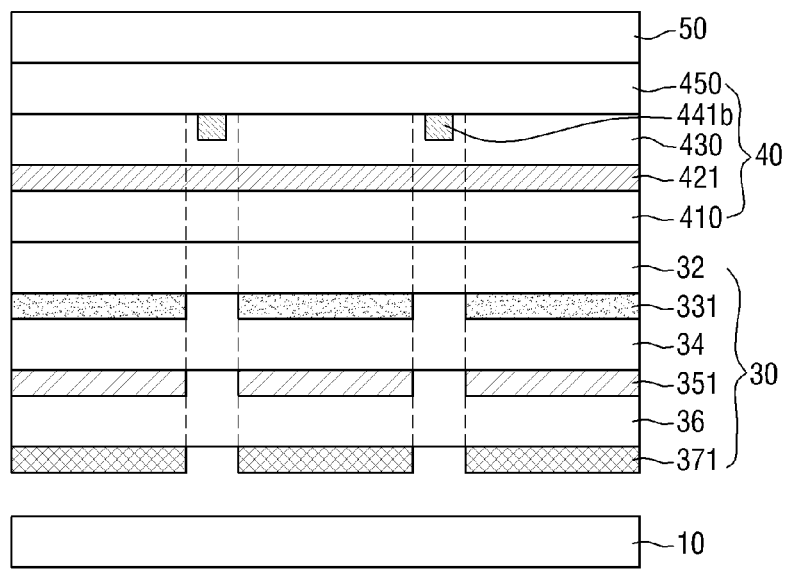
FIGS. 8 to 11 are partial cross-sectional views of the display device illustrated in FIG. 7.
Figure 9:
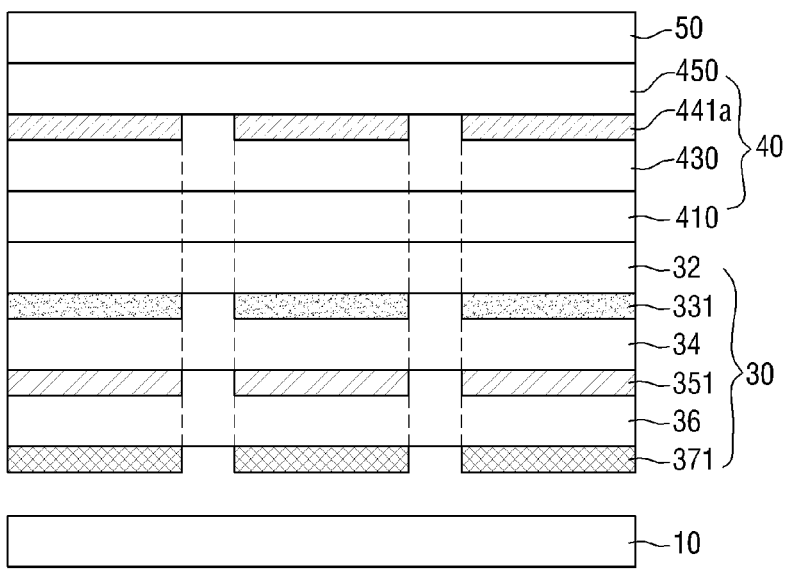
Figure 10:
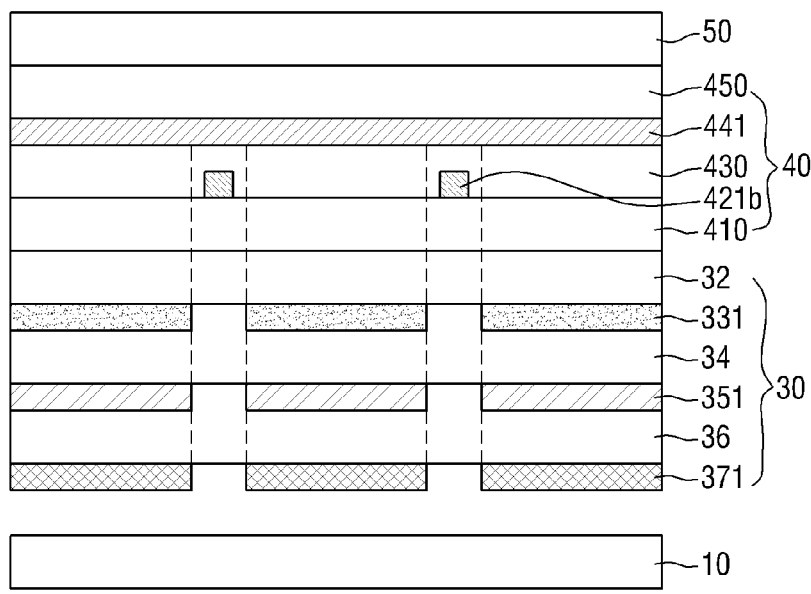
Figure 11:
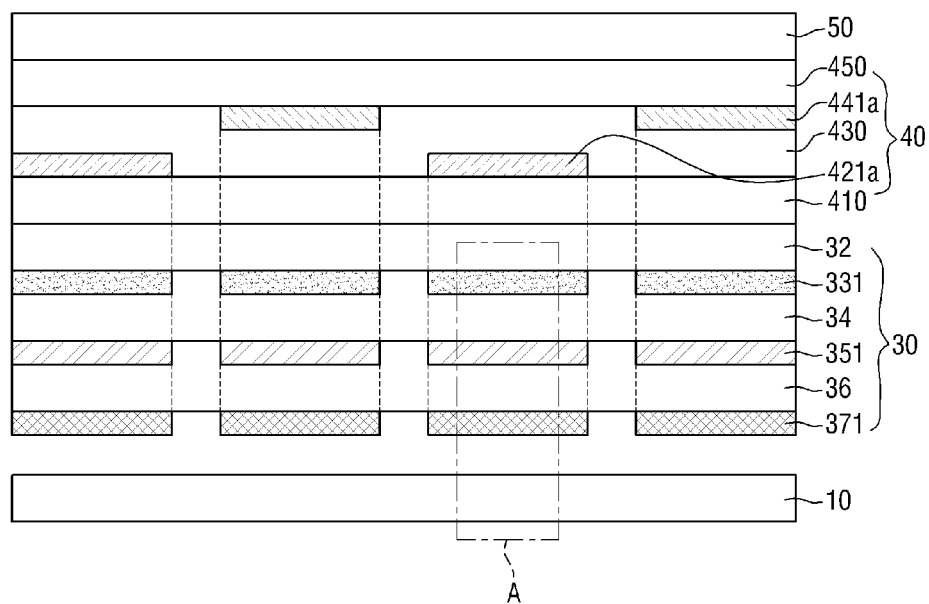

FIG. 7 is a plan view illustrating the exemplary structure of the display device illustrated in FIG. 1. More specifically, FIG. 7 illustrates the exemplary structure of the display device including the destructive interference portion having the structure illustrated in FIG. 4 and the touch sensing portion illustrated in FIGS. 5 and 6. FIGS. 8 to 11 are partial cross-sectional views of the display device illustrated in FIG. 7. More specifically, FIG. 8 is a cross-sectional view of the display device illustrated in FIG. 7, taken along line P1-P2 of FIG. 7 and FIG. 9 is a cross-sectional view of the display device of FIG. 7, taken along line P3-P4 of FIG. 7. Further, FIG. 10 is a cross-sectional view of the display device illustrated in FIG. 7, taken along line P5-P6 of FIG. 7 and FIG. 11 is a cross-sectional view of the display device of FIG. 7, taken along line P7-P8 of FIG. 7.

Referring to the embodiment of FIGS. 1 to 11, the first metal pattern 331 is formed prior to the second dielectric layer 34. In this embodiment, the first metal pattern 331 is directly formed on the lower surface of the first dielectric layer 32. Further, the second dielectric layer 34 is formed on the lower portion of the first metal pattern 331. A portion (or a gap space between the first metal patterns) in which the first metal pattern 331 is not formed is filled by the second dielectric layer 34. That is, when the first metal pattern 331 is formed prior to the second dielectric layer 34, the second dielectric layer 34 covers the lower portion of the first metal pattern 331 and the lower surface of the first dielectric layer 32.

In a similar manner, the second metal pattern 351 is formed prior to the third dielectric layer 36 and the second metal pattern 351 is directly formed on the lower surface of the second dielectric layer 34. Further, the third dielectric layer 36 is formed on the lower portion of the second metal pattern 351. A portion (or a gap space between the second metal patterns) in which the second metal pattern 351 is not formed is filled by the third dielectric layer 36. That is, when the second metal pattern 351 is formed prior to the third dielectric layer 36, the third dielectric layer 36 covers the lower portion of the second metal pattern 351 and the lower surface of the second dielectric layer 34.

The first sensing patterns 421a overlap the first metal patterns 331, the second metal patterns 351, and the third metal patterns 371, and in some embodiments, as illustrated in the FIGS. 7-11, all of the one of the first metal patterns 331, one of the second metal patterns 351, and one of the third metal patterns 371 completely overlap the respective first sensing patterns 421a. However, this is merely exemplary. If the areas of the first metal patterns 331, the second metal patterns 351, and the third metal patterns 371 are smaller than the areas of the first sensing patterns, the numbers of the first to third sensing patterns 331, 351, and 371 may be two or more for each of the first sensing patterns 421a.

Similar to the first sensing patterns 421a, the second sensing patterns 441a overlap the first metal patterns 331, the second metal patterns 351, and the third metal patterns 371. Since a more detailed relationship between the second sensing patterns 441a and the first to third metal patterns 331, 351 and 371 are the same as or are similar to those as described above for the first sensing pattern 421a, a description thereof will be omitted.

In some embodiments, one of the first metal patterns 331, the second metal patterns 351, and the third metal patterns 371 that overlap each other in the vertical direction overlap only one of the first sensing patterns 421a or one of the second sensing pattern 441a. In other words, one of the first metal patterns 331, the second metal patterns 351, and the third metal patterns 371 that overlap each other in the vertical direction based on the drawing overlap only one of the first sensing patterns 421a and one of the second sensing pattern 441a as illustrated in FIG. 11, but not both of the first sensing patterns 421a and the second sensing pattern 441a.

Figure 12:
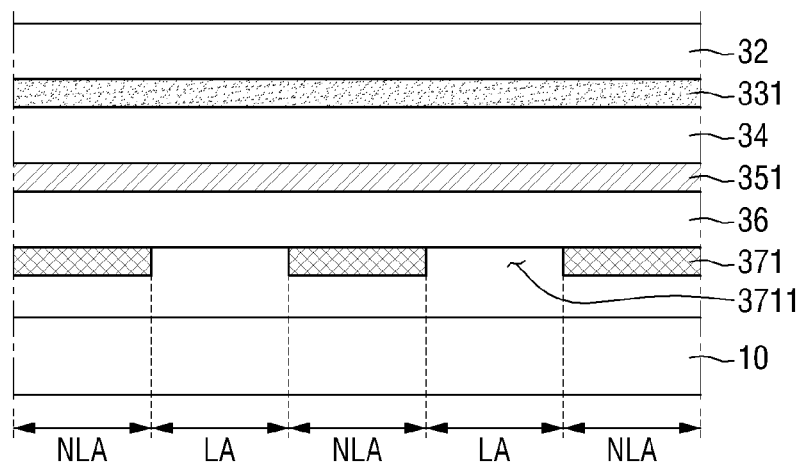
FIG. 12 is a partially enlarged cross-sectional view of a portion of the display device illustrated in FIG. 11.

FIG. 12 is a partially enlarged cross-sectional view of a portion of the display device illustrated in FIG. 11. More specifically, FIG. 12 is an enlarged cross-sectional view of a portion "A" in FIG. 11.

In the embodiment of FIGS. 3, 11, and 12, the third metal layer 37 is a light blocking layer. As described above with reference to FIG. 3, the light blocking layer can prevents ambient light incident on the destructive interference portion 30 from being transmitted into the light-emitting regions LA of the display panel 10. the light blocking layer can also prevent ambient light from being reflected in the non-light-emitting regions NLA and thus being emitted to the environment via the destructive interference portion DI.

When the third metal layer 37 is the light blocking layer, a plurality of light permeation openings 3711 are formed in areas of the third metal pattern 371 of the third metal layer 37 that overlap the light-emitting regions LA of the display panel 10. Further, the light emitted from the light-emitting region LA can be emitted to the environment (or upper portion of the display panel) through the light permeation opening 3711.

Figure 13:
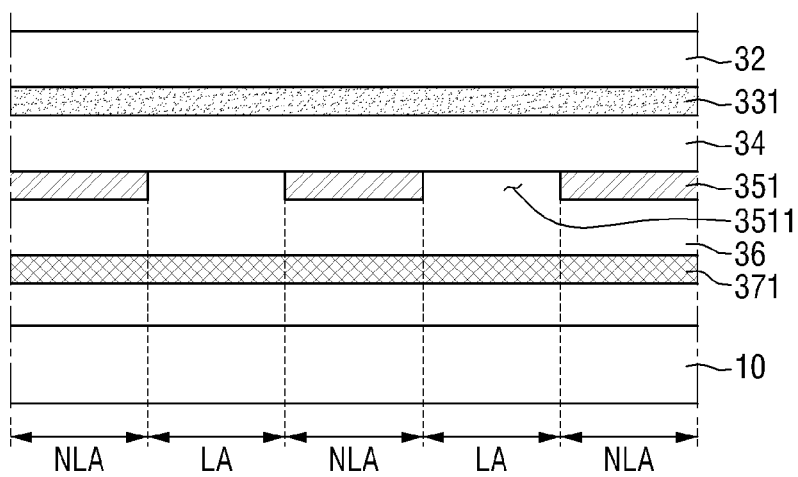
FIGS. 13 and 14 are partially enlarged cross-sectional views illustrating additional examples of the display device illustrated in FIG. 12.
Figure 14:
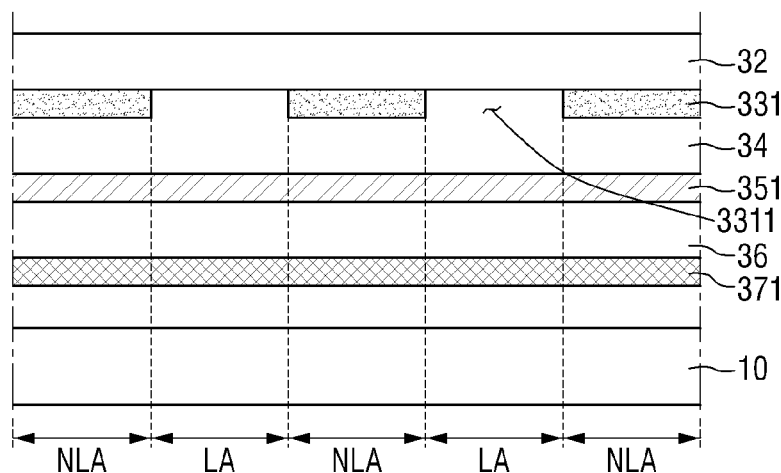

FIGS. 13 and 14 are partially enlarged cross-sectional views illustrating additional examples of the display device illustrated in FIG. 12.

Referring to FIGS. 3, 12, and 13, in another exemplary embodiment, the second metal layer 35 is the light blocking layer. When the second metal layer 35 is the light blocking layer, the light permeation openings 3511 are formed in areas of the second metal pattern 351 of the second metal layer 35 that overlap the light-emitting regions LA of the display panel 10. Further, the light emitted from the light-emitting region LA is emitted to the environment via the light permeation openings 3511.

Referring to FIGS. 3, 12, and 14, in still another exemplary embodiment, the first metal layer 35 is the light blocking layer. When the first metal layer 33 is the light blocking layer, the light permeation openings 3311 are formed in areas of the first metal pattern 331 of the first metal layer 33 that overlap the light-emitting regions LA of the display panel 10. Further, the light emitted from the light-emitting region LA is emitted to the environment via the light permeation opening 3311.

Figure 15:
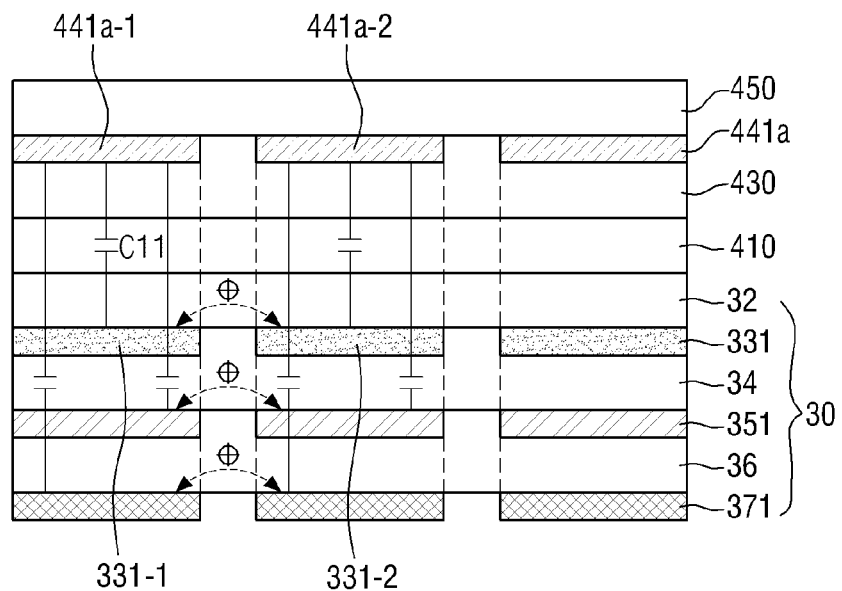
FIG. 15 is a cross-sectional view explaining the schematic operation of the touch sensing structure illustrated in FIG. 3.

FIG. 15 is a cross-sectional view explaining the schematic operation of the touch sensing structure illustrated in FIG. 3. Exemplarily, FIG. 15 illustrates only the configuration of the destructive interference portion and the touch sensing portion in FIG. 9.

The touch sensing portion 40 senses whether a touch input occurs based on a change in capacitance between the first electrode 421 (in FIG. 7) and the second electrode 441 (in FIG. 7). Furthermore, the destructive interference portion 30 includes a plurality of metal layers 33, 35, and 37 (in FIG. 3) and parasitic capacitance is formed between the first electrode 421 (in FIG. 7) or the second electrode 441 (in FIG. 7) and the metal layers 33, 35, and 37 (in FIG. 3). When a single layer including the metal layers 33, 35, and 37 (in FIG. 3) is integrally formed, the respective metal layers 33, 35, and 37 (in FIG. 3) provide charge movement paths.

Accordingly, interference occurs between the first electrodes that are adjacent to each other or the second electrodes that are adjacent to each other which may cause the touch input to be not normally recognized.

In contrast, in the display device according to this embodiment, as illustrated in FIG. 15, the metal layers 33, 35, and 37 (in FIG. 3) are formed to includes separate metal patterns 331, 351, and 371. Accordingly, even when the parasitic capacitance is formed, the interference can be prevented from occurring between the adjacent electrodes since charge cannot freely flow therebetween.

Exemplarily, referring to FIG. 15, even if the parasitic capacitance C11 is formed between an arbitrary first sensing pattern 441a-1 and the first metal pattern 331-1 formed below the first sensing pattern, the first metal pattern 331-1 and the adjacent first metal pattern 331-2 are physically separated from each other, and thus the charge that is formed due to the parasitic capacitance C11 is prevented from moving from the first metal pattern 331-1 to the first metal pattern 331-2. Accordingly, the influence of the interference due to the parasitic capacitance C11 can be reduced in the first sensing pattern 441a-1 and the neighboring first sensing pattern 441a-2.

Similarly, the second metal pattern 351 and the third metal pattern 371 are also separated from each other and even if a parasitic capacitance is formed between an arbitrary first sensing pattern 441a-1 and the second and third metal patterns 351 and 371, the influence of interference due to the parasitic capacitance can be reduced in the first sensing pattern 441a-1 and the neighboring first sensing pattern 441a-2.

That is, according to at least one embodiment, at least one of the metal layers 33, 35, and 37 (in FIG. 3) included in the destructive interference portion 30 is formed as a plurality of metal patterns separated from each other, and thus the touch recognition rate can be prevented from being deteriorated due to the formation of the parasitic capacitance.

In the drawings, it is illustrated that at least one of the sensing patterns, for example, the first sensing pattern 441a-1 overlaps one of the first metal patterns 331, but this is merely exemplary. That is, the sensing patterns, for example, the first sensing pattern 441a-1 may overlap two or more of the first metal patterns 331. In some embodiments, by making the areas of each of the first metal patterns 331 smaller than the area of the first sensing pattern 441a-1, the number of first metal patterns 331 that overlap the first sensing patterns 441a-1 may be set to two or more. In these embodiments, the areas of the first metal patterns 331 that overlap the first sensing patterns 441a-1 is reduced, and thus the level of the parasitic capacitance can be reduced. Accordingly, the additional influence of the parasitic capacitance on the touch recognition rate can be reduced. Similarly, the number of second metal patterns 351 and the third metal patterns 371 that overlap the first sensing patterns 441a-1 can be increased to two or more. Since the detailed explanation thereof is the same as that as described above, the description thereof will be omitted.

Figure 16:
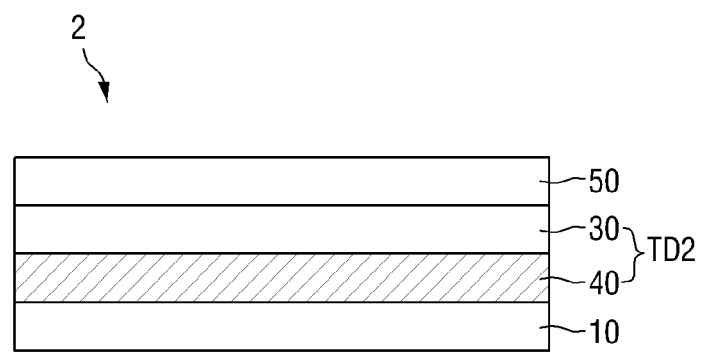
FIG. 16 is a cross-sectional view illustrating the stacked structure according to a modified example of the display device illustrated in FIG. 1.

FIG. 16 is a cross-sectional view illustrating the stacked structure according to a modified example of the display device illustrated in FIG. 1.

Referring to FIG. 16, in the display device 2 according to this embodiment, the touch sensing structure TD2 is formed on the display panel 10 and the encapsulation member 50 is formed on the touch sensing structure TD2.

The touch sensing structure TD2 is different from the touch sensing structure TD1 illustrated in FIG. 1. A touch sensing portion 40 is formed on the display panel 10 and the destructive interference portion 30 is formed on the touch sensing portion 40. The encapsulation member 50 is formed on the touch sensing portion 40.

The display device 2 according to the embodiment of FIG. 16 is different from the display device 1 illustrated in FIG. 1 in that the stacking order of the destructive interference portion 30 and the touch sensing portion 40 is different from that of the display device 1 illustrated in FIG. 1. As described above with reference to FIGS. 1 to 16, other configurations of the display device 2 according to this embodiment are the same as those of the display device 1 of FIG. 1.

Figure 17:
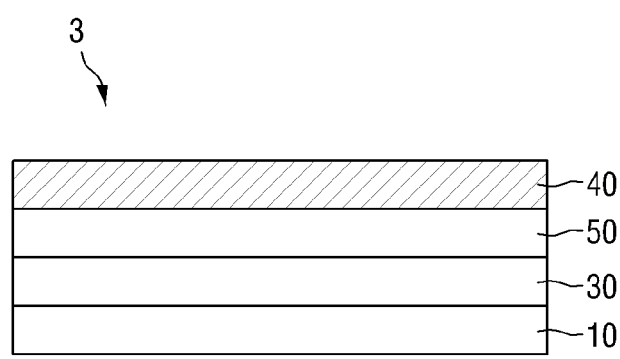
FIG. 17 is a cross-sectional view illustrating the stacked structure according to another modified example of the display device illustrated in FIG. 1.

FIG. 17 is a cross-sectional view illustrating the stacked structure according to a modified example of the display device illustrated in FIG. 1.

Referring to FIG. 17, the display device 3 according to this embodiment is different from the display device 1 illustrated in FIG. 1 in that the stacking order is different from that of the display device 1 illustrated in FIG. 1, but the other structures of the display device 2 are the same as those of the display device 1 of FIG. 1.

Specifically, in the display device according to the embodiment of FIG. 17, the destructive interference portion 30 is formed on a display panel 10 and the encapsulation member 50 is formed on the destructive interference portion 30. Further, the touch sensing portion 40 is formed on the encapsulation member 50. That is, the display device 3 according to the embodiment of FIG. 17 is different from the display device 1 (in FIG. 1) in that the touch sensing portion 40 is formed on the encapsulation member 50, but the other structures thereof are the same as those of the display device 1.

Figure 18:
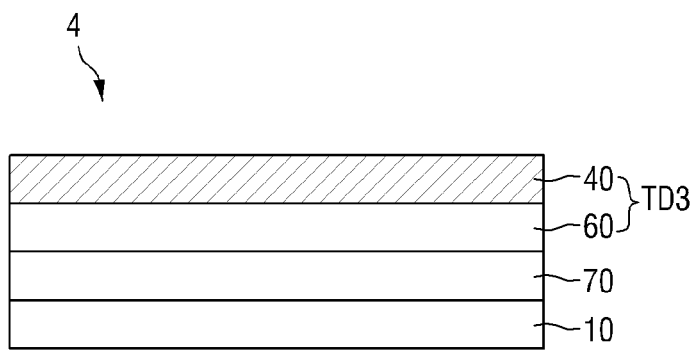
FIG. 18 is a cross-sectional view illustrating the schematic stacked structure of a display device according to another embodiment.

FIG. 18 is a cross-sectional view illustrating the schematic stacked structure of a display device according to another embodiment.

Referring to FIG. 18, the display device 4 includes a display panel 10, an encapsulation member 70 formed on the display panel 10, and a touch sensing structure TD3 formed on the encapsulation member 70. Although not illustrated in the drawings, the display device 4 may further include a window formed on the touch sensing structure TD3. In order to improve the adhesive force between the touch sensing structure TD3 and the window, an adhesive layer may be additionally interposed between the touch sensing structure TD3 and the window. The display device 4 according to the embodiment of FIG. 18 is different from the display device 1 as described above with reference to FIG. 1 in that the encapsulation member 70 is formed on the display panel 10 and the touch sensing structure TD3 is formed on the encapsulation member 70, but the remaining structures thereof are the same as those of the display device 1. Accordingly, a detailed description will be provided for only the differences the duplicated descriptions will only be briefly described or omitted.

The encapsulation member 70 is formed the display panel 10 of the display device 4. The encapsulation member 70 may be a transparent insulating substrate. For example, the encapsulation member 70 may be formed of glass, quartz, or a transparent insulating resin. In exemplary embodiments, air or an inert gas such as nitrogen ($N_2$) fills a space formed between the encapsulation member 70 and the display panel 10. In some embodiments, a protection layer (not illustrated) is additionally interposed between the display panel 10 and the encapsulation member 70. In these embodiments, the protection layer may be formed of a photoresist, an acryl-based resin, a polyimide-based resin, a polyamide-based resin, and/or a siloxane-based resin, but is not limited thereto. Further, in some embodiments, the protection layer itself is the encapsulation member 70. That is, the encapsulation member 70 may be formed of a transparent insulating resin that directly covers the upper portion of the display panel 10.

The touch sensing structure TD3 is formed on the encapsulation member 70 and the touch sensing structure TD3 includes a destructive interference portion 60 and a touch sensing portion 40. The details of the touch sensing structure TD3 will be described later.

Figure 19:
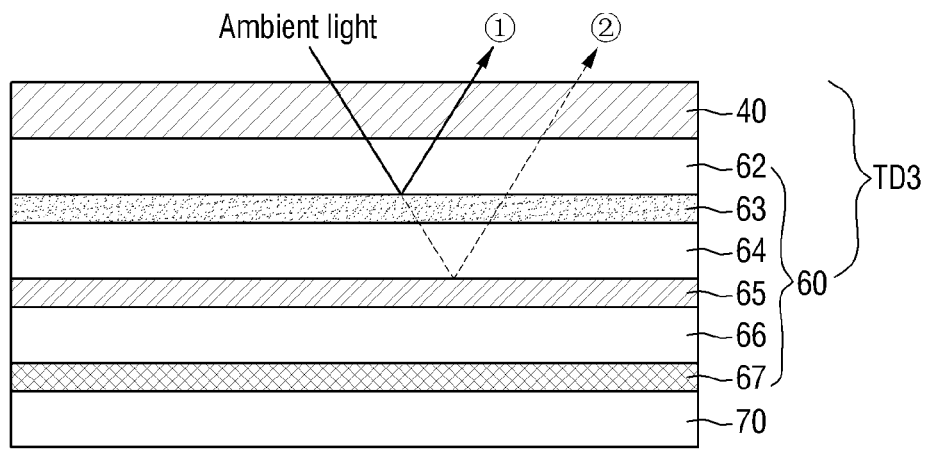
FIG. 19 is a cross-sectional view illustrating the schematic stacked structure of the touch sensing structure in the display device illustrated in FIG. 18.

FIG. 19 is a cross-sectional view illustrating the schematic stacked structure of the touch sensing structure in the display device illustrated in FIG. 18.

Referring to FIGS. 18 and 19, the touch sensing structure TD3 is formed on the encapsulation member 70 and includes the destructive interference portion 60 and the touch sensing portion 40 formed on the destructive interference portion 60.

The destructive interference portion 60 reduces the reflection of ambient light by causing destructive interference to occur in the ambient light that is incident on the touch sensing portion 40 and reflected from the destructive interference portion 60. As described above, destructive interference refers to the phenomenon where the superposition of light having substantially equal amplitudes and a phase difference of about 180° have an overall amplitude of about "0." In the embodiment of FIG. 19, light reflected from the interfaces between the layers of the destructive interference portion 60 are superimposed to destructively interfere.

The destructive interference portion 60 includes a plurality of metal layers and a plurality of dielectric layers, which are alternately stacked. For example, the destructive interference portion 60 includes a first dielectric layer 62, a first metal layer 63, a second dielectric layer 64, and a second metal layer 65, and may further include a third dielectric layer 66 and/or a third metal layer 67. Explanation of the first dielectric layer 62, the first metal layer 63, the second dielectric layer 64, the second metal layer 65, the third dielectric layer 66, and the third metal layer 67 is substantially the same as or similar to the explanation of the first dielectric layer 32, the first metal layer 33, the second dielectric layer 34, the second metal layer 35, the third dielectric layer 36, and the third metal layer 37 as described above with reference to FIG. 3, and thus duplicate descriptions thereof will be only briefly described or omitted. In addition, in some embodiments, in contrast to the structure illustrated in the drawing, the stacking order of the metal layers 63, 65, and 67 and the dielectric layers 62, 64, and 66 may be changed as described above with reference to FIG. 3.

The first dielectric layer 62 is a phase matching layer or a phase compensation layer. The first dielectric layer 62 may include any one material selected from the following: silicon oxide ($SiO_2$), titanium oxide ($TiO_2$), lithium fluoride (LiF), calcium fluoride ($CaF_2$), magnesium fluoride ($MgF_2$), silicon nitride ($SiN_x$), tantalum oxide ($Ta_2O_5$), niobium oxide ($Nb_2O_5$), silicon carbonitride (SiCN), molybdenum oxide ($MoO_x$), iron oxide ($FeO_x$), chromium oxide ($CrO_x$), and strontium oxide ($SnO_2$).

The first metal layer 63 is formed below the first dielectric layer 62. The first metal layer 63 absorbs a portion of the ambient light and reflects a portion of the ambient light incident thereon. The first metal layer 63 may be formed of a material having a high light absorption rate so as to reduce the amount of reflected ambient light through absorption of a portion of the ambient light incident on the destructive interference portion DI. For example, the first metal layer 63 may include any one material selected from the following: chromium (Cr), molybdenum (Mo), tungsten (W), titanium (Ti), nickel (Ni), cobalt (Co), copper oxide (CuO), titanium nitride ($TiN_x$), and nickel sulfide (NiS) or an alloy thereof, which can be used solely or in combination.

The second dielectric layer 64 is formed below the first metal layer 63. Similar to the first dielectric layer 62, the second dielectric layer 64 is a phase matching layer or a phase compensation layer.

The second metal layer 65 is formed below the second dielectric layer 64. Similar to the first metal layer 63, the second metal layer 65 may be formed of a metal material having a high light absorption rate.

The third metal layer 67 is formed below the second metal layer 65 and the third dielectric layer 66 is interposed between the third metal layer 67 and the second metal layer 65.

In an exemplary embodiment, the third metal layer 67 is a light blocking layer. For example, the third metal layer 67 may correspond to (or overlap) the non-light-emitting region NLA (in FIG. 2) of the display panel 10 and may include a plurality of light permeation openings formed in areas that overlap the light-emitting regions LA (in FIG. 2) of the display panel 10. The third metal layer 67 may be located the closest to the display panel 10. When the third metal layer 67 is a light blocking layer, in some embodiments, the third metal layer 67 is formed of any one material selected from the following: chromium (Cr), molybdenum (Mo), aluminum (Al), silver (Au), titanium (Ti), carbon black, and copper oxide (CuO). The third metal layer 67 may have a thickness that can prevent the ambient light that is incident thereon from being transmitted into the light-emitting regions LA (in FIG. 2) of the display panel. In an exemplary embodiment, the third metal layer 67 has a thickness of about 50 nm or greater, but is not limited thereto.

In another exemplary embodiment, the first metal layer 63 or the second metal layer 65 may be the light blocking layer. For example, when the first metal layer 63 is the light blocking layer, the second metal layer 65 and the third metal layer 67 prevent the reflection of ambient light via destructive interference. Further, when the second metal layer 65 is the light blocking layer, the first metal layer 63 and the third metal layer 67 prevent the reflection of ambient light via destructive interference.

The third dielectric layer 66 is interposed between the second metal layer 65 and the third metal layer 67. Since the explanation of the third dielectric layer 66 is the same as or similar to that of the first dielectric layer 62 or the second dielectric layer 64, the detailed description thereof will be omitted. Hereinafter, an embodiment wherein the destructive interference portion 60 includes the third dielectric layer 66 is exemplified. However, this is merely exemplary, and the third dielectric layer 66 may be omitted when necessary.

The touch sensing portion 40 is formed on the destructive interference portion 60 and the touch sensing portion 40 includes a plurality of sensing patterns. Since the explanation of the touch sensing portion 40 is the same as that as described above with reference to FIGS. 5 and 6, the description thereof will be omitted.

Figure 20:
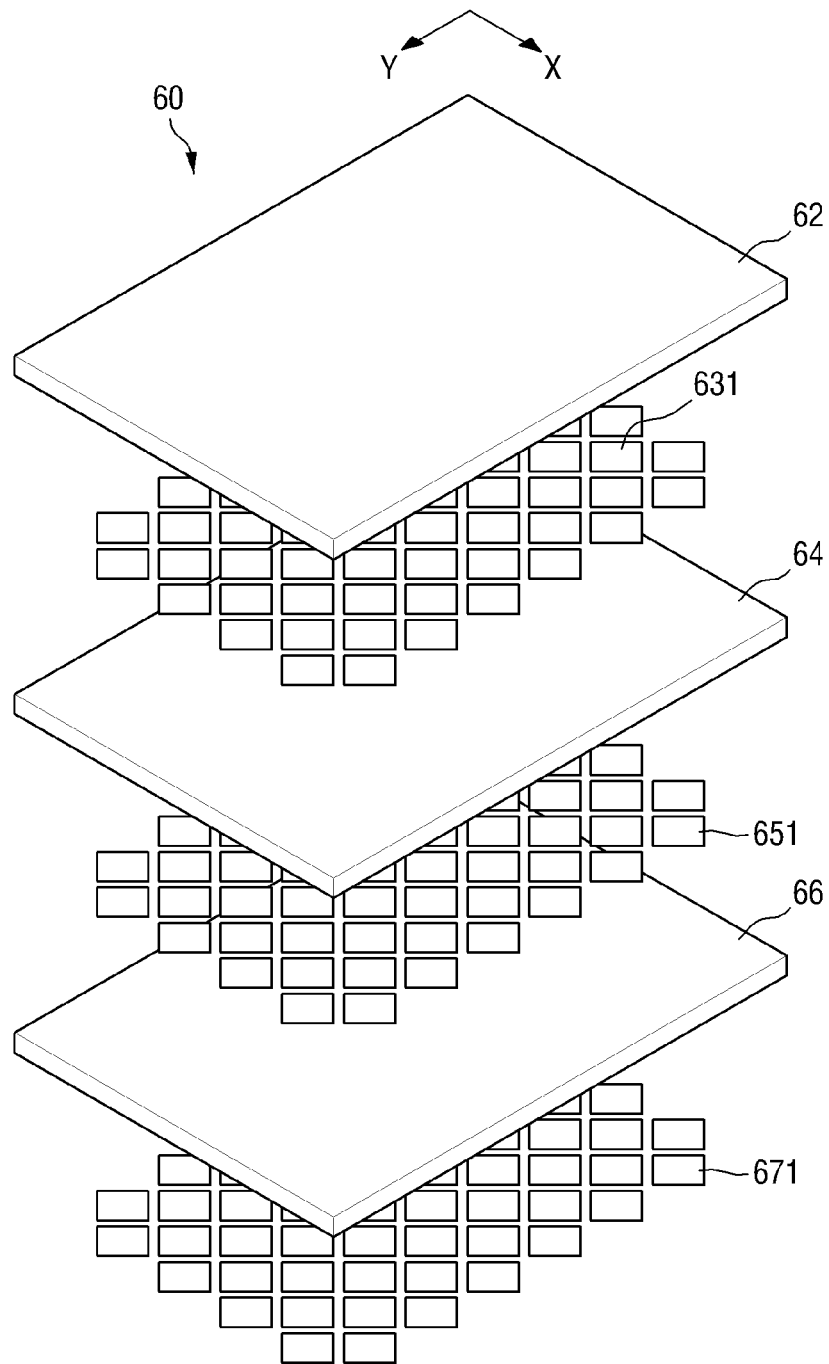
FIG. 20 is an exploded perspective view illustrating the exemplary structure of the destructive interference portion illustrated in FIG. 19.

FIG. 20 is an exploded perspective view illustrating an exemplary structure of the destructive interference portion illustrated in FIG. 18.

Referring to the embodiment of FIGS. 18 to 20, the destructive interference portion 60 includes the first dielectric layer 62, the first metal layer 63 formed below the first dielectric layer 22, the second dielectric layer 64 formed below the metal layer 63, and the second metal layer 65 formed below the second dielectric layer 64 as described above with reference to FIG. 18. This embodiment further includes the third dielectric layer 66 and the third metal layer 67 that are formed below the second metal layer 65.

The first metal layer 63 includes a plurality of first metal patterns 631 that are separated from each other. The second metal layer 65 includes a plurality of second metal patterns 651 that are separated from each other. Similarly, the third metal layer 67 is formed below the third dielectric layer 66, and the third metal layer 67 includes a plurality of third metal patterns 671 that are separated from each other.

Since the detailed explanation of the first metal pattern 631, the second metal pattern 651, and the third metal pattern 671 is the same as the explanation of the first metal pattern 331 (in FIG. 4), the second metal pattern 351 (in FIG. 4), and the third metal pattern 371 (in FIG. 4) as described above with reference to FIG. 4, the description thereof will be omitted.

Figure 21:
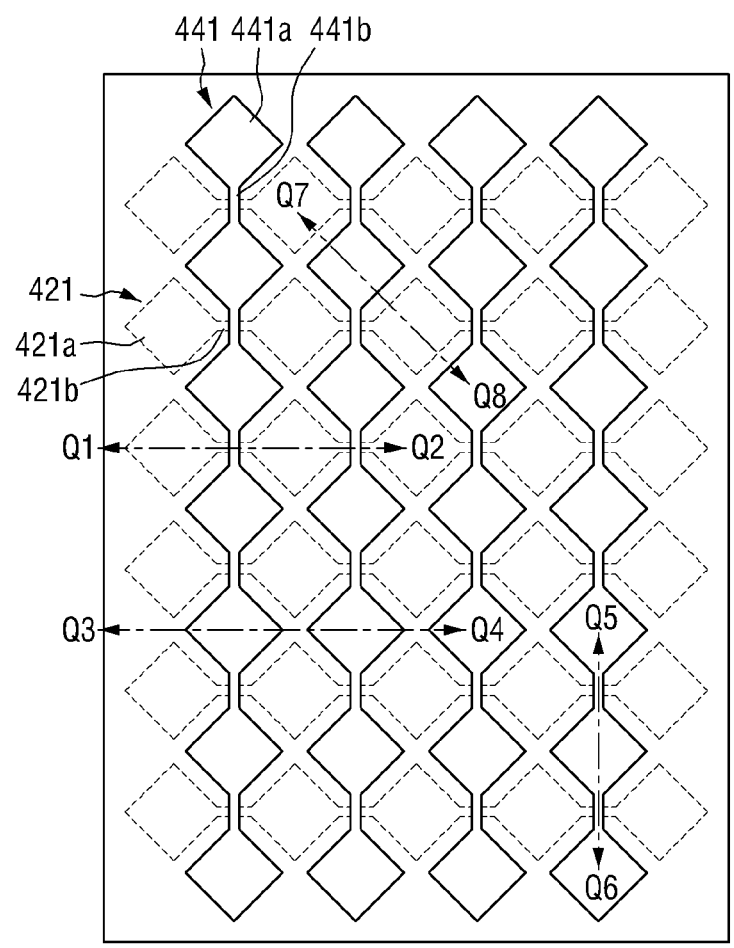
FIG. 21 is a plan view illustrating the exemplary structure of the display device illustrated in FIG. 18.
Figure 22:
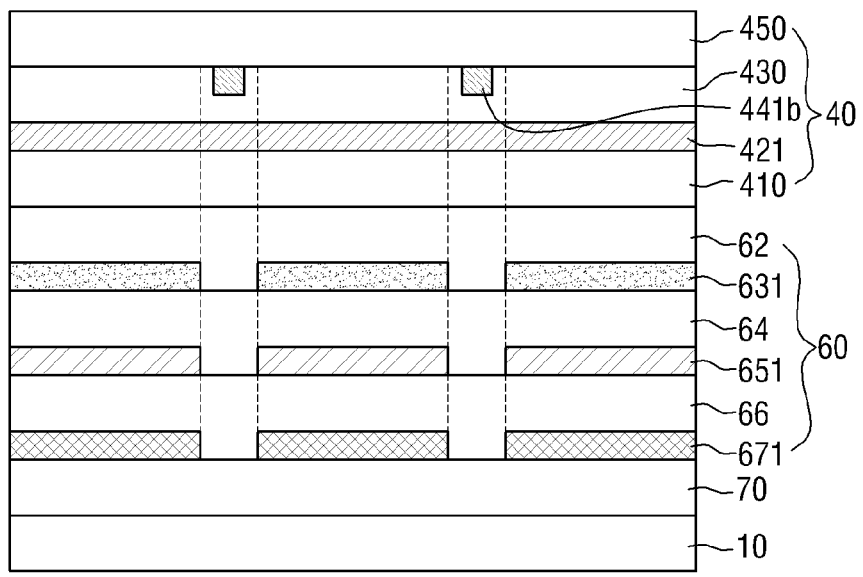
FIGS. 22 to 25 are partial cross-sectional views of the display device illustrated in FIG. 21.
Figure 23:
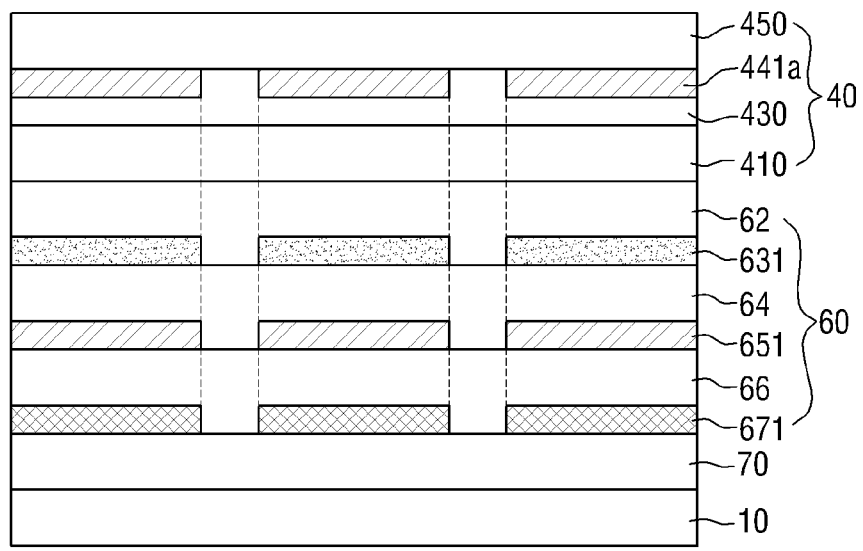
Figure 24:
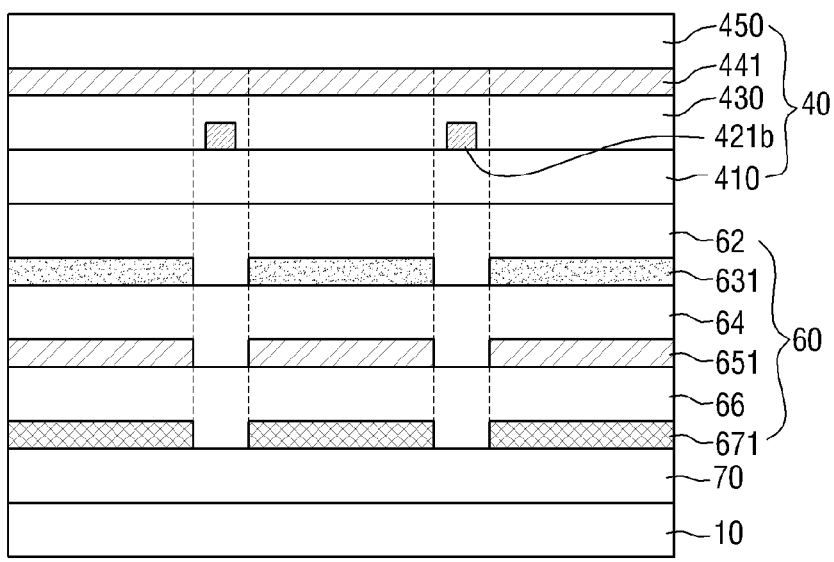
Figure 25:
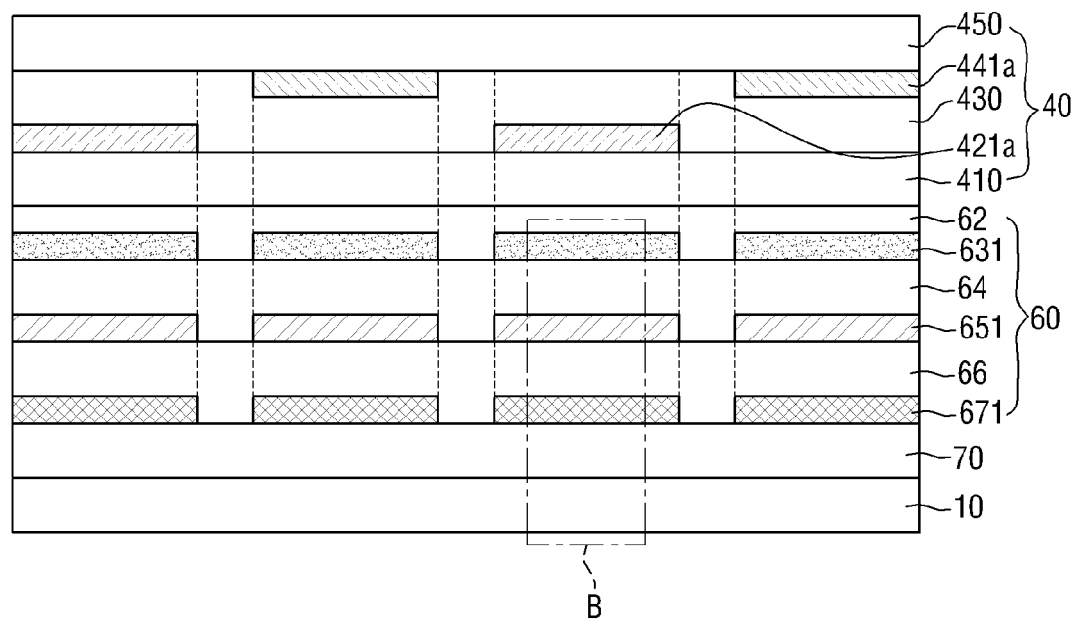

FIG. 21 is a plan view illustrating an exemplary structure of the display device illustrated in FIG. 18. FIGS. 22 to 25 are partial cross-sectional views of the display device illustrated in FIG. 21. More specifically, FIG. 22 is a cross-sectional view of the display device illustrated in FIG. 21, taken along line Q1-Q2 of FIG. 21 and FIG. 23 is a cross-sectional view of the display device of FIG. 21, taken along line Q3-Q4 of FIG. 21. Further, FIG. 24 is a cross-sectional view of the display device illustrated in FIG. 21, taken along line Q5-Q6 of FIG. 21 and FIG. 25 is a cross-sectional view of the display device of FIG. 21, taken along line Q7-Q8 of FIG. 21.

Referring to the embodiment of FIGS. 18 to 25, the first metal pattern 631 is formed after the third dielectric layer 66 and prior to the second dielectric layer 64. In this embodiment, the first metal pattern 631 is formed directly on the upper surface of the second dielectric layer 64. Further, the first dielectric layer 62 is formed on the upper portion of the first metal pattern 631 and a portion (or a gap space between the first metal patterns) in which the first metal pattern 631 is not arranged is filled by the first dielectric layer 62.

With continuing reference to the embodiment of FIGS. 18 to 25, the second metal pattern 651 is formed after than the third dielectric layer 66 and prior to the second dielectric layer 64. In this embodiment, the second metal pattern 651 is formed directly on the upper surface of the third dielectric layer 66. Further, the second dielectric layer 64 is formed on the upper portion of the second metal pattern 651 and a portion (or a gap space between the second metal patterns) in which the second metal pattern 651 is not arranged is filled by the second dielectric layer 64.

Further, the third metal pattern 671 is formed before to the third dielectric layer 66 and the third metal pattern 671 may be directly formed on the upper surface of the encapsulation member 70, or may be formed on a separate base material. Further, the third dielectric layer 66 is formed on the upper portion of the third metal pattern 671 and the portion where the third metal pattern 671 is not arranged is filled by the third dielectric layer 66. In an exemplary embodiment, when the third metal pattern 671 is directly formed on the upper surface of the encapsulation member 70, the third dielectric layer 66 covers the upper surfaces of the third metal pattern 671 and the encapsulation member 70.

The relationships between the first sensing pattern 421a and the second sensing pattern 441a of the touch sensing portion 40, the first metal pattern 631, the second metal pattern 651, and the third sensing pattern 671 are substantially the same as the first sensing pattern 421a, the second sensing pattern 441a, the first metal pattern 331, the second metal pattern 351, and the third sensing pattern 371, described in connection with FIG. 15 and thus the detailed description thereof will be omitted.

Figure 26:
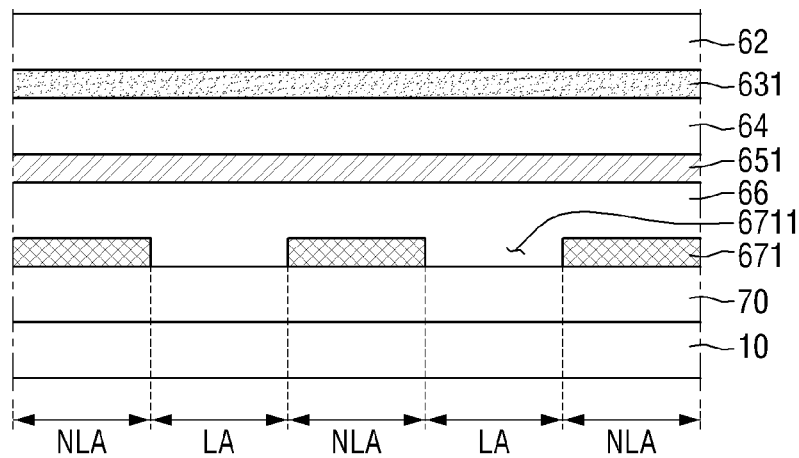
FIG. 26 is a partially enlarged cross-sectional view of a portion of the display device illustrated in FIG. 25.

FIG. 26 is a partially enlarged cross-sectional view of a portion of the display device illustrated in FIG. 25. More specifically, FIG. 26 is an enlarged cross-sectional view of a portion "B" in FIG. 25.

Referring to the embodiment of FIGS. 18 to 26, the third metal layer 67 is a light blocking layer. The light blocking layer prevents the ambient light that is incident thereon from being transmitting into the light-emitting regions LA of the display panel 10, and prevents the ambient light from being reflected by the non-light-emitting regions NLA, thus preventing the light from being emitted to the environment via the destructive interference portion DI.

When the third metal layer 67 is the light blocking layer, a plurality of light permeation openings 6711 are formed in areas that correspond to the light-emitting regions LA of the display panel 10 in the third metal pattern 671 of the third metal layer 67. Further, the light0emitted from the light-emitting region LA is emitted to the environment (or upper portion of the display panel) through the light permeation openings 6711.

Figure 27:
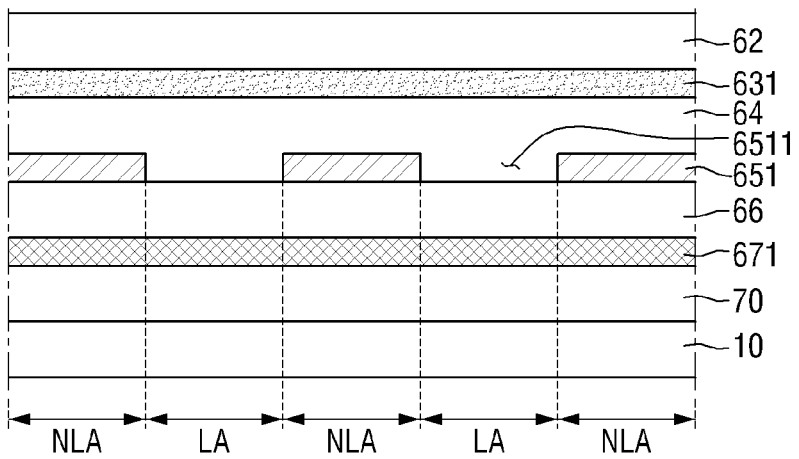
FIGS. 27 and 28 are partially enlarged cross-sectional views illustrating additional examples of the display device illustrated in FIG. 26.
Figure 28:
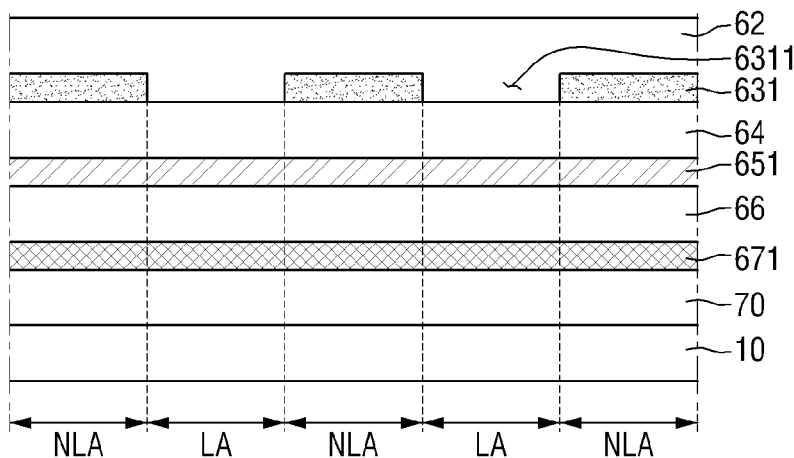

FIGS. 27 and 28 are partially enlarged cross-sectional views illustrating additional examples of the display device illustrated in FIG. 26.

Referring to the embodiment of FIGS. 18 to 25, and 27, the second metal layer 65 is a light blocking layer. When the second metal layer 65 is the light blocking layer, a plurality of light permeation openings 6511 are formed in areas that overlap the light-emitting regions LA of the display panel 10 in the second metal pattern 651 of the second metal layer 65. Further, the light emitted from the light-emitting regions LA is emitted to the environment through the light permeation opening 6511.

Referring to the embodiment of FIGS. 18 to 25, and 28, the first metal layer 65 is a light blocking layer. When the first metal layer 63 is the light blocking layer, a plurality of light permeation openings 6311 are formed in areas that correspond to the light-emitting regions LA of the display panel 10 in the first metal pattern 631 of the first metal layer 63. Further, the light emitted from the light-emitting region LA is emitted to the environment through the light permeation opening 6311.

Figure 29:
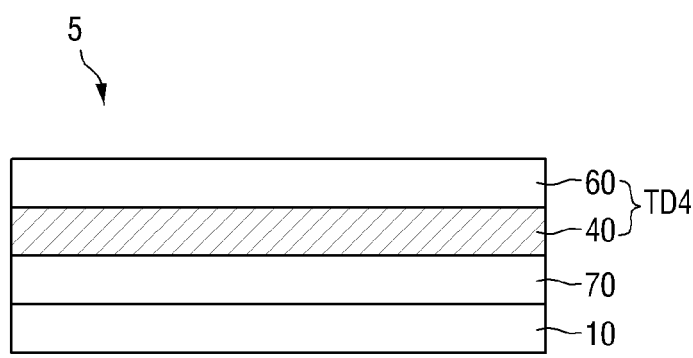
FIG. 29 is a cross-sectional view illustrating the stacked structure according to a modified example of the display device illustrated in FIG. 18.

FIG. 29 is a cross-sectional view illustrating the stacked structure according to a modified example of the display device illustrated in FIG. 18.

Referring to FIG. 29, the display device 5, in contrast to the touch sensing structure TD3 illustrated in FIG. 18, includes the touch sensing portion 40 formed on the encapsulation member 70 and the destructive interference portion 60 formed on the touch sensing portion 40. That is, the display device 5 according to this embodiment is different from the display device 4 (in FIG. 18) illustrated in FIG. 18 in that the stacking order of the destructive interference portion 60 and the touch sensing portion 40 differs, but other configurations may be the same as those as described above with reference to FIGS. 18 to 28.

Although preferred embodiments of the inventive technology have been described for illustrative purposes, those skilled in the art will appreciate that various modifications, additions and substitutions are possible, without departing from the scope and spirit of the invention as disclosed in the accompanying claims.

What is claimed is:

1. A display device, comprising:
    a display panel including a light-emitting region and a non-light-emitting region;

a touch sensor disposed over the display panel and including a plurality of sensing patterns; and a destructive interference unit disposed over the display panel and overlapping the touch sensor, wherein the destructive interference unit includes a plurality of dielectric layers and a plurality of metal layers that are alternately stacked, wherein at least one of the metal layers includes a plurality of metal patterns that are separated from each other, the metal patterns defining a plane, wherein each of the metal patterns overlaps only one of the sensing patterns in a direction substantially perpendicular to the plane defined by the metal patterns, and wherein each of the metal patterns is formed in a different plane than each of the sensing patterns.

2. The display device of claim 1, wherein the destructive interference unit comprises:

a first dielectric layer;

a first metal layer disposed below the first dielectric layer and including a plurality of first metal patterns that are separated from each other;

a second dielectric layer disposed below the first metal layer; and a second metal layer disposed below the second dielectric layer and including a plurality of second metal patterns that are separated from each other, wherein the second metal patterns respectively overlap the first metal patterns.

3. The display device of claim 2, wherein the area of each of the first and second metal patterns is substantially equal to or less than the area of each of the sensing patterns.

4. The display device of claim 2, wherein the second metal patterns are arranged to completely overlap the first metal patterns.

5. The display device of claim 2, wherein each of the sensing patterns overlaps one or more of the first metal patterns and one or more of the second metal patterns.

6. The display device of claim 2, further comprising:

a third metal layer disposed below the second metal layer and including a plurality of third metal patterns that are separated from each other; and a third dielectric layer interposed between the second metal layer and the third metal layer, wherein the third metal patterns respectively overlap the first metal patterns and the second metal patterns.

7. The display device of claim 6, wherein the area of each of the third metal patterns is substantially equal to or less than the area of each of the sensing patterns.

8. The display device of claim 6, wherein the third metal patterns are arranged to completely overlap the first metal patterns and the second metal patterns.

9. The display device of claim 6, wherein each of the sensing patterns overlaps one or more of the first metal patterns, one or more of the second metal patterns, and one or more of the third metal patterns.

10. The display device of claim 1, wherein at least one of the metal layers comprises an opening overlapping the light-emitting region.

11. The display device of claim 1, further comprising an encapsulation member disposed over the display panel, wherein the touch sensor and the destructive interference unit are interposed between the encapsulation member and the display panel.

12. The display device of claim 1, further comprising an encapsulation member disposed over the display panel, wherein the destructive interference unit is interposed between the encapsulation member and the display panel and wherein the touch sensor is disposed over the encapsulation member.

13. The display device of claim 1, further comprising an encapsulation member disposed over the display panel, wherein the touch sensor and the destructive interference unit are disposed over the encapsulation member.

14. The display device of claim 1, wherein the touch sensor comprises:

a plurality of first electrodes each including a plurality of first sensing patterns connected to each other in a first direction; and a plurality of second electrodes each including a plurality of second sensing patterns connected to each other in a second direction crossing the first direction.

15. The display device of claim 1, wherein each of the dielectric layers is formed of any one material selected from the following: silicon oxide ($SiO_2$), titanium oxide ($TiO_2$), lithium fluoride (LiF), calcium fluoride ($CaF_2$), magnesium fluoride ($MgF_2$), silicon nitride ($SiN_x$), tantalum oxide ($Ta_2O_5$), niobium oxide ($Nb_2O_5$), silicon carbonitride (SiCN), molybdenum oxide ($MoO_x$), iron oxide ($FeO_x$), chromium oxide ($CrO_x$), and strontium oxide ($SnO_2$).

16. The display device of claim 1, wherein each of the metal layers is formed of any one material selected from the following: chromium (Cr), molybdenum (Mo), tungsten (W), titanium (Ti), nickel (Ni), cobalt (Co), copper oxide (CuO), titanium nitride ($TiN_x$), and nickel sulfide (NiS).

17. A touch sensing structure, comprising:

a destructive interference unit including a plurality of dielectric layers and a plurality of metal layers that are alternately stacked; and a touch sensor overlapping the destructive interference unit and including a plurality of sensing patterns, wherein at least one of the metal layers includes a plurality of metal patterns that are separated from each other, the metal patterns defining a plane, wherein each of the metal patterns overlaps only one of the sensing patterns in a direction substantially perpendicular to the plane defined by the metal patterns, and wherein each of the metal patterns is formed in a different plane than each of the sensing patterns.

18. The touch sensing structure of claim 17, wherein the destructive interference unit comprises:

a first dielectric layer;

a first metal layer disposed below the first dielectric layer and including a plurality of first metal patterns that are separated from each other;

a second dielectric layer disposed below the first metal layer; and a second metal layer disposed below the second dielectric layer and including a plurality of metal patterns that are separated from each other, wherein the second metal patterns respectively overlap the first metal patterns, and wherein each of the sensing patterns overlaps one or more of the first metal patterns and one or more of the second metal patterns.

19. The touch sensing structure of claim 18, further comprising:

a third metal layer disposed below the second metal layer and including a plurality of third metal patterns that are separated from each other; and a third dielectric layer interposed between the second metal layer and the third metal layer, wherein the third metal patterns respectively overlap the first metal patterns and the second metal patterns, and wherein each of the sensing patterns overlaps one or more of the first metal patterns, one or more of the second metal patterns, and one or more of the third metal patterns.

20. The touch sensing structure of claim 17, wherein the touch sensor comprises:
- a plurality of first electrodes each including a plurality of first sensing patterns connected to each other in a first direction; and
- a plurality of second electrodes each including a plurality of second sensing patterns connected to each other in a second direction crossing the first direction.

\* \* \* \* \*